United States Patent [19]
Nakao et al.

[11] Patent Number: 5,651,072
[45] Date of Patent: Jul. 22, 1997

[54] VIBRATION DAMPING SYSTEM FOR VEHICLE

[75] Inventors: Norihiko Nakao; Shin Takehara; Naoki Ikeda; Chiaki Santo; Hirofumi Seni; Shingo Harada; Yutaka Tukahara, all of Hiroshima-ken, Japan

[73] Assignee: Mazda Motor Corporation, Hiroshima-ken, Japan

[21] Appl. No.: 85,951

[22] Filed: Jul. 6, 1993

[30] Foreign Application Priority Data

| Jul. 6, 1992 | [JP] | Japan | 4-178489 |
| Jul. 10, 1992 | [JP] | Japan | 4-183675 |
| Jul. 10, 1992 | [JP] | Japan | 4-183862 |
| Jun. 30, 1993 | [JP] | Japan | 5-160704 |

[51] Int. Cl.$^6$ .................................................. G10K 11/16
[52] U.S. Cl. .................................................. 381/71.2
[58] Field of Search .................................. 381/71, 94, 86

[56] References Cited

U.S. PATENT DOCUMENTS

| 5,082,421 | 1/1992 | Acton et al. | 415/118 |
| 5,414,775 | 5/1995 | Scribner et al. | 381/71 |

FOREIGN PATENT DOCUMENTS

| 61-220926 | 10/1986 | Japan . |
| 2201858 | 9/1988 | United Kingdom . |

*Primary Examiner*—Forester W. Isen
*Attorney, Agent, or Firm*—Sixbey, Friedman, Leedom & Ferguson, P.C.; Gerald J. Ferguson, Jr.; Donald R. Studebaker

[57] ABSTRACT

A vibration damping system for a vehicle includes a vibration sensor which detects vibration of a particular vibrating element, an actuator which applies vibration to the particular vibrating element and a controller which receives a vibration signal output from the vibration sensor and controls the actuator to apply to the particular vibrating element such vibration that damps the vibration detected by the vibration sensor. The controller is provided with a sensitivity changing circuit which changes the sensitivity of the vibration sensor according to a predetermined condition of the vehicle.

16 Claims, 32 Drawing Sheets

Y CO-ORDINATE

Z CO-ORDINATE
Lx
→ X CO-ORDINATE

FIG. 14

| ENGINE SPEED \ W/D MODE | W/D MODE 1 | W/D MODE 2 | ...... | W/D MODE n |
|---|---|---|---|---|
| $R_1$ | VIBRATION MODE 11 | | ............ | VIBRATION MODE n |
| $R_2$ | : | | | : |
| : | : | | | : |
| : | : | | | : |
| $R_n$ | VIBRATION MODE 1n | | ............ | VIBRATION MODE nn |

F I G. 19
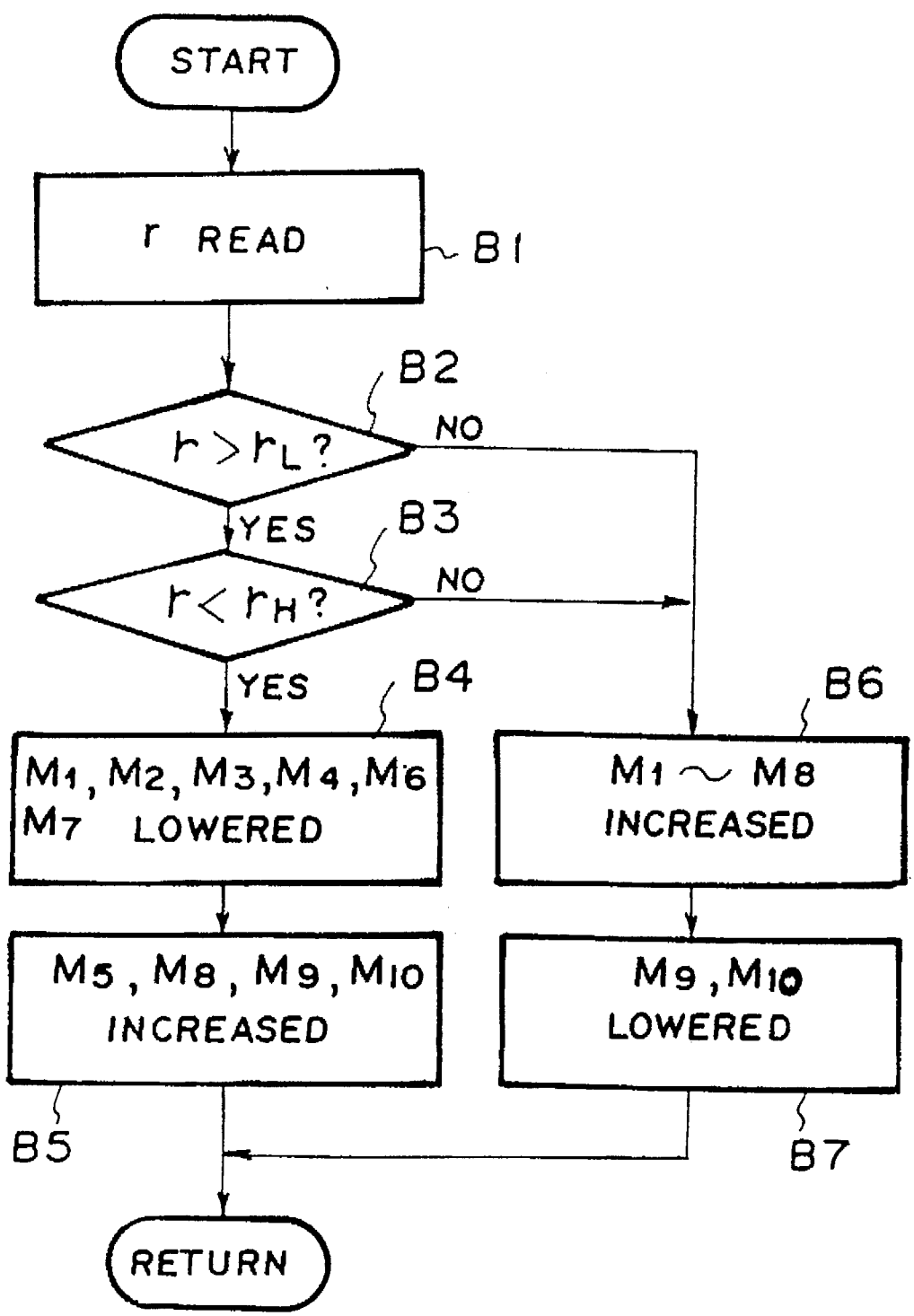

F I G. 34
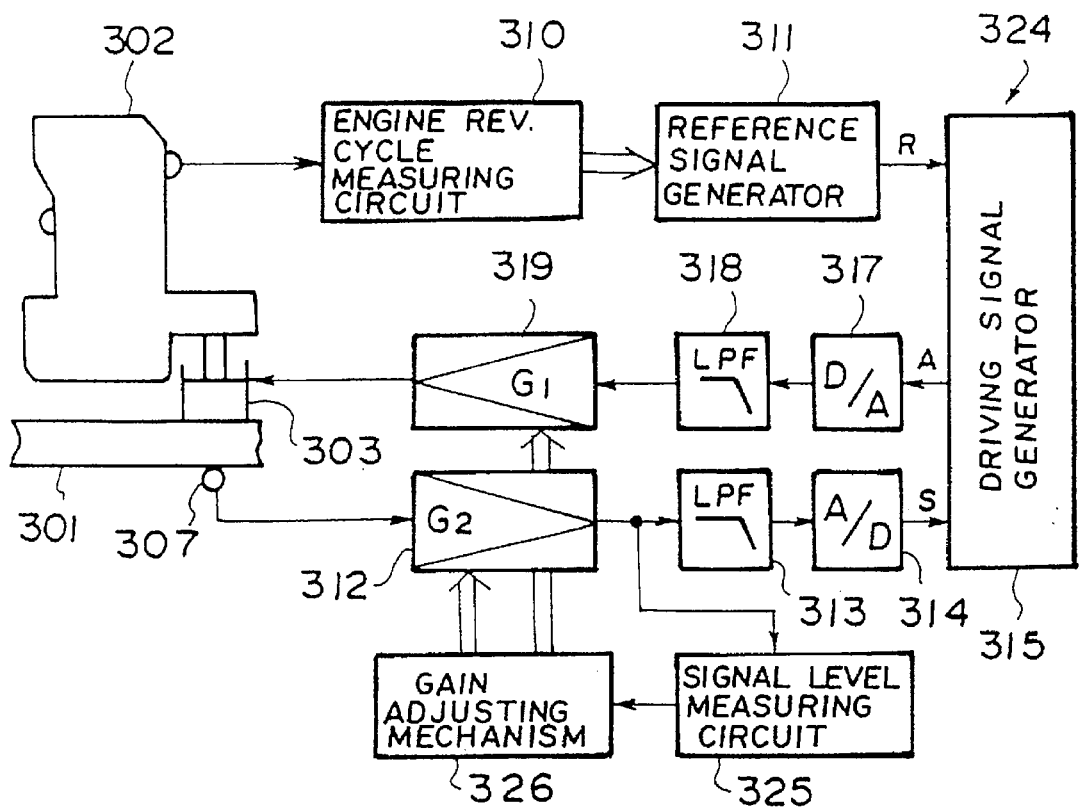
F I G. 35
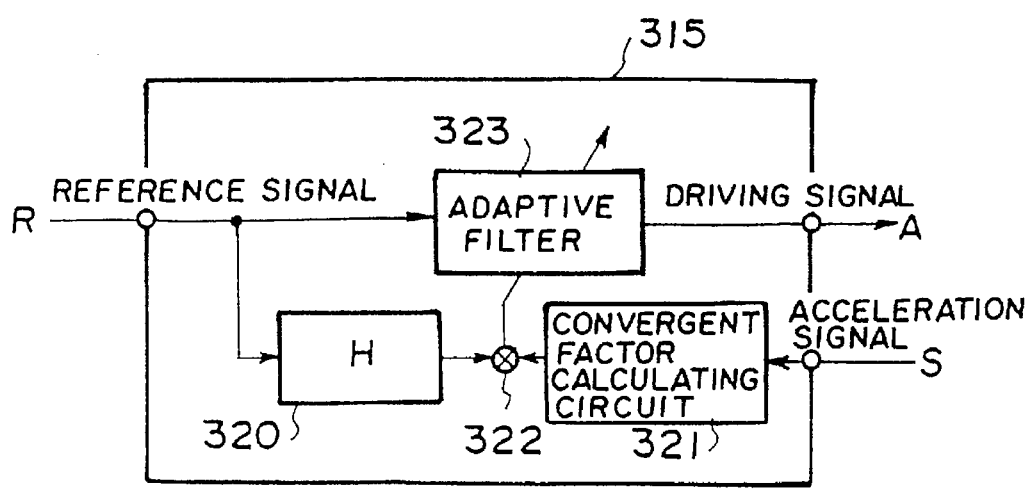

FIG.39

→ INCREASE

| ACCELERATOR DEPRESSION | $A_1$ | $A_2$ | · · · · · | $A_n$ |
|---|---|---|---|---|
| $G_1$ | $G_{11}$ | $G_{12}$ | | $G_{1n}$ |
| $G_2$ | $G_{21}$ | $G_{22}$ | | $G_{2n}$ |

FIG.40

| RANGE | P | R | N | D | S | L |
|---|---|---|---|---|---|---|
| $G_1$ | $G_{1P}$ | $G_{1R}$ | $G_{1N}$ | ·· | ·· | $G_{1L}$ |
| $G_2$ | $G_{2P}$ | $G_{2R}$ | ·· | ·· | ·· | $G_{2L}$ |

VIBRATION DAMPING SYSTEM FOR VEHICLE

BACKGROUND OF THE INVENTION

1. Field of the Invention

This invention relates to a vibration damping system for a vehicle, and more particularly to an improvement of a vibration damping system for a vehicle which has an actuator for vibrating a particular vibrating element such as the vehicle body, air in the cabin or the like and applies to the particular vibrating element vibration which is reverse to the vibration of the particular vibrating element in phase and equal to the vibration of the same in amplitude, thereby damping the vibration of the vehicle body or air in the cabin (noise).

2. Description of the Prior Art

As disclosed in Japanese Unexamined Patent Publication No. 1(1989)-501344, there has been known a vibration damping system for a vehicle in which vibration of a particular vibrating element on the vehicle body generated by vibration of the engine and the like is detected by a vibration sensor disposed in a predetermined position and an actuator for vibrating the particular vibrating element is controlled to apply vibration to the particular vibrating element to damp the vibration detected by the vibration sensor.

In various vibrations generated in a vehicle body, the vibration which is to be damped first varies depending on the condition of the vehicle such as the vehicle speed, the engine speed, whether the window is opened and the like. That is, where the vibration which is to be damped first is generated or the condition of the vibration, e.g., whether noise in the cabin increases or the vibration of the vehicle body increases, varies depending on the condition of the vehicle. Accordingly, in order to effectively damp various vibrations generated in the vehicle body, it is preferred that a number of vibration sensors be disposed in various positions on the vehicle body and each of the sensors be as sensitive as possible to be able to detect a fine change in vibration.

However even if a sensitivity of a certain vibration sensor is increased, if the vibration detected by the vibration sensor is not so related to the vibration to be damped, it will not be effective to control the actuator on the basis of the vibration signal output from the vibration sensor. Further when a plurality of vibration sensors are provided, the relations between the vibrations detected by the respective vibration sensors and the vibration to be damped will differ from vibration sensor to vibration sensor. That is, vibrations detected by some of the vibration sensors are deeply related to the vibration to be damped and vibrations detected by other vibration sensors are not. In the conventional vibration damping systems having a plurality of vibration sensors, the vibration signals output from the respective vibration sensors are all dealt with in the same way and the driving signal for controlling the actuator is always calculated on the basis of all the vibration signals. Accordingly, as the number of the vibration sensors increases, the amount of calculation to be performed in an unit time increases in vain and the vibration damping cannot be effected with a high efficiency.

SUMMARY OF THE INVENTION

In view of the foregoing observations and description, the primary object of the present invention is to provide a vibration damping system for a vehicle which can efficiently damp vibration of a predetermined vibrating element on the vehicle.

In accordance with one aspect of the present invention, there is provided a vibration damping system for a vehicle comprising a vibration sensor which detects vibration of a particular vibrating element, an actuator which applies vibration to the particular vibrating element and a control means which receives a vibration signal output from the vibration sensor and controls the actuator to apply to the particular vibrating element such vibration that damps the vibration detected by the vibration sensor, characterized by having a sensitivity changing means which changes the sensitivity of the vibration sensor according to a predetermined condition of the vehicle.

In accordance with another aspect of the present invention, there is provided a vibration damping system for a vehicle comprising a plurality of vibration sensors which detect vibration of particular vibrating elements, an actuator which applies vibration to the particular vibrating elements and a control means which receives vibration signals output from the vibration sensors and controls the actuator to apply to the particular vibrating element such vibration that damps the vibration detected by the vibration sensors, characterized by having a sensitivity changing means which changes the sensitivity ratio of the vibration sensors according to a predetermined condition of the vehicle.

The actuator may apply vibration to the particular vibrating element either directly or indirectly.

The sensitivity of the vibration sensor may be changed, for instance, by changing the level of the vibration signal output from the vibration sensor for a given amplitude of the vibration input into the vibration sensor or by changing the frequency at which the vibration signal from the vibration sensor is input into the controlling means.

The predetermined condition of the vehicle may be the engine speed, the engine load, the position of the passengers, whether the vehicle is accelerating or decelerating, the vehicle speed, opening and closure of the windows, the condition of the air-conditioner, the condition of shift of the transmission, the condition of the audio system on the vehicle, or the like.

BRIEF DESCRIPTION OF THE DRAWINGS

FIG. 14 is a three-dimensional map showing correspondences of the vibration mode of the vehicle body to the engine speed and the weight distribution mode on the vehicle body, FIG. 19 is a flow chart for illustrating the operation of the controller when changing the sensitivities of the microphones according to the engine speed, FIG. 34 is a block diagram showing the structure of the controller employed in the sixth embodiment, FIG. 35 is a block diagram showing the structure of the driving signal generator employed in the sixth embodiment, FIG. 39 is a view showing a modification of the memory map, and FIG. 40 is a view showing another modification of the memory map.

DESCRIPTION OF THE PREFERRED EMBODIMENTS

A first embodiment of the present invention will be described with reference to FIGS. 1 to 8, hereinbelow. In this embodiment, noise in the cabin of a vehicle is damped by a control sound output from a speaker. The vibration damping system of this embodiment has a plurality of vibration sensors (microphones) and the sensitivity ratios of the vibration sensors are changed by changing the sensitivity of a predetermined vibration sensor.

Figure 1:
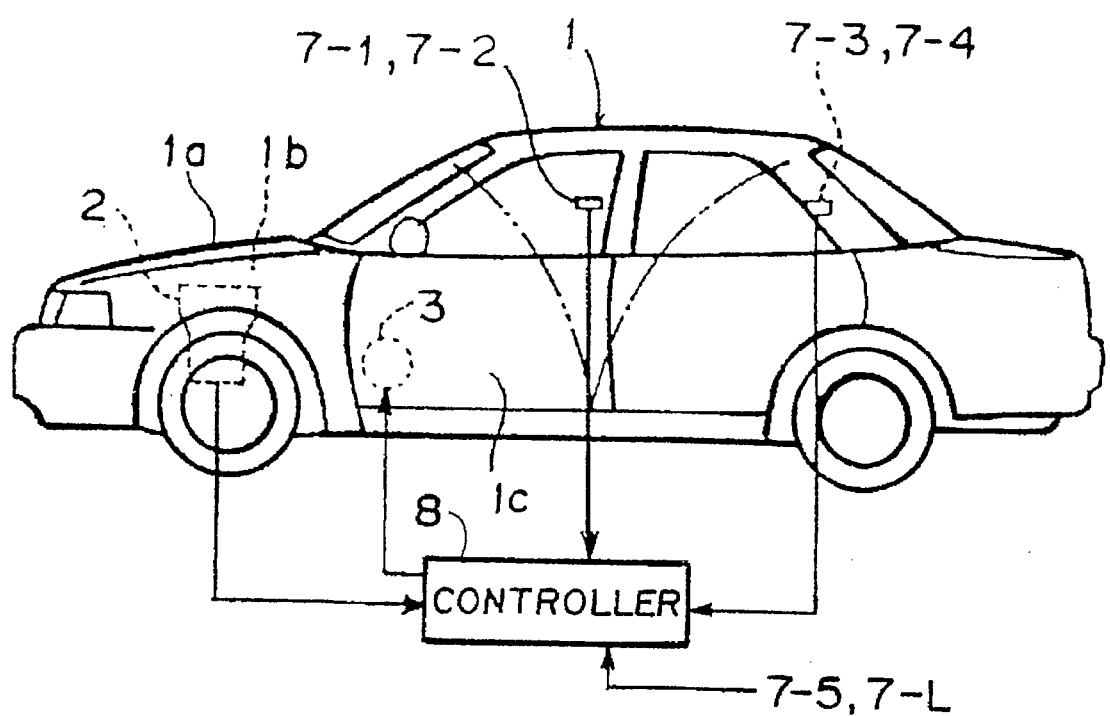
FIG. 1 is a schematic view showing a vehicle provided with a vibration damping system in accordance with a first embodiment of the present invention.

In FIG. 1, an engine 2 is housed in an engine room 1b of a vehicle body 1. Reference numeral 1a denotes an engine hood. A speaker (as the actuator) 3 is provided on an inner panel of a door 1c and the speaker 3 outputs control sound panel for damping noise in the cabin. Microphones (as the vibration sensors) to the number of L (7-1, 7-2, . . . . . , 7-L) are positioned in the cabin, two (7-1 and 7-2) in headrests of the front seats (not shown), another two (7-3 and 7-4) on the left and right ends of the rear seat and the others in a front pillars and the like.

Each of the microphones 7-1 to 7-L detects noise in the cabin and outputs a noise signal to a controller 8. The controller 8 causes the speaker 3 to output control sound in the cabin on the basis of the noise signals, thereby damping the noise in the cabin.

Figure 2:
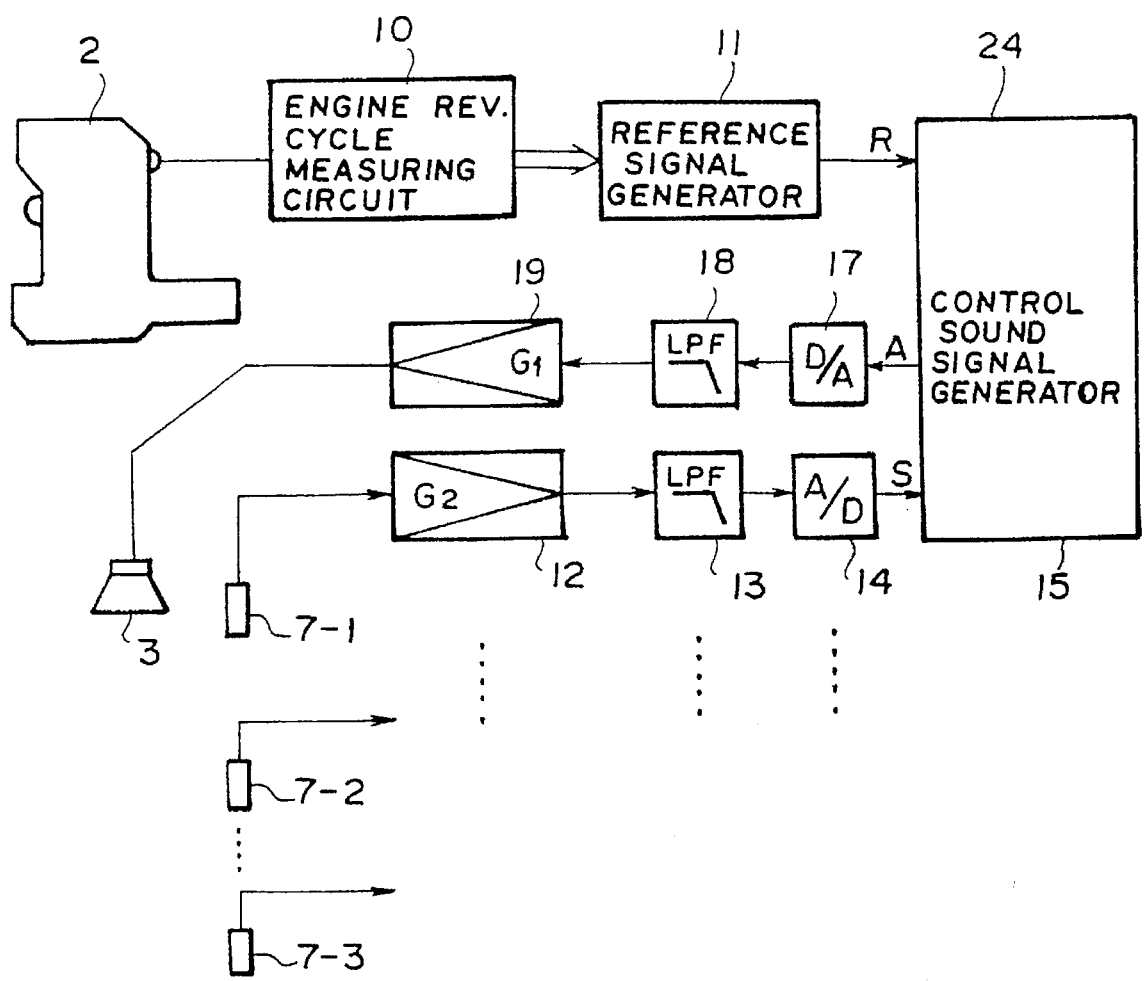
FIG. 2 is a block diagram showing the structure of the controller employed in the first embodiment.
Figure 3:
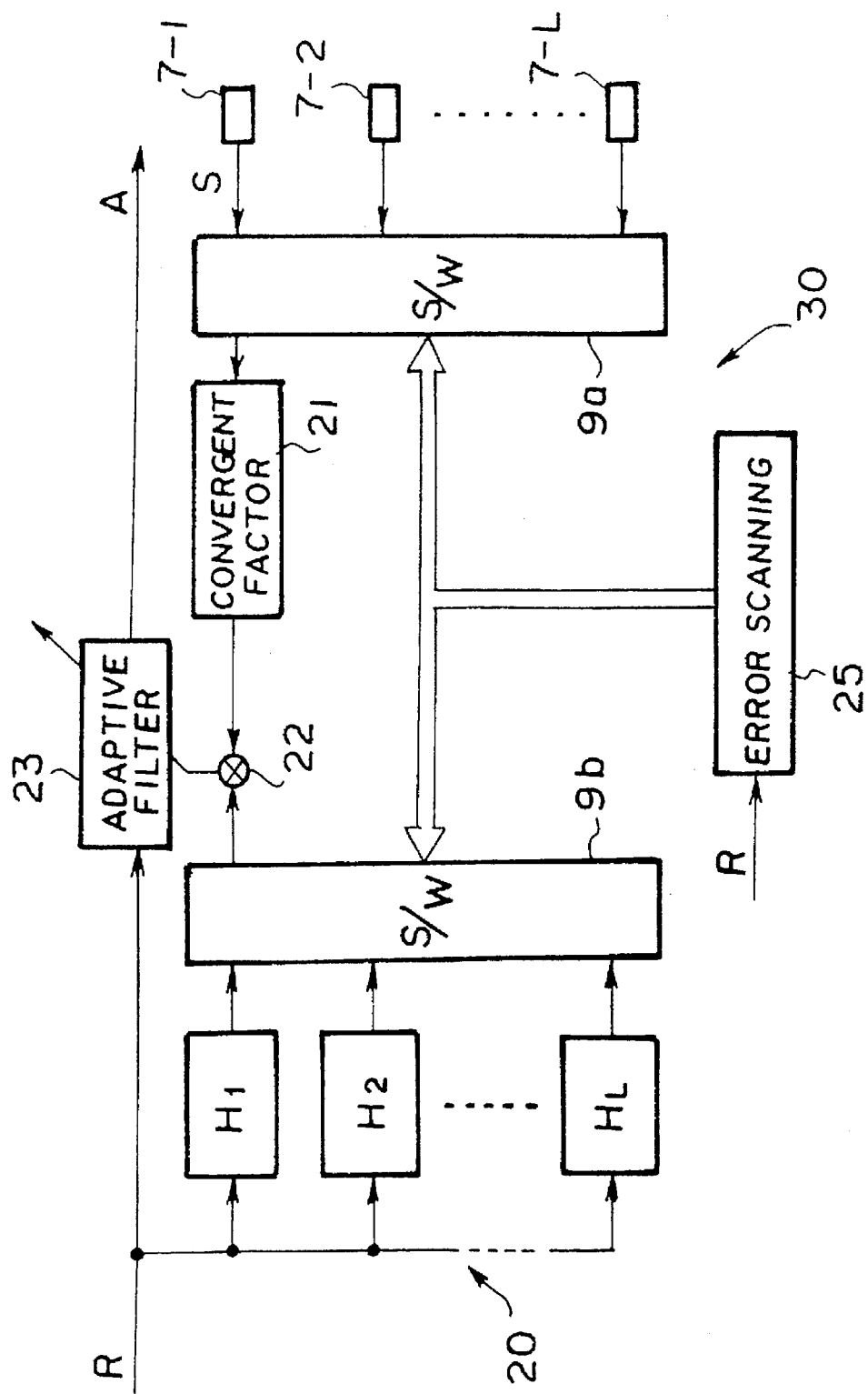
FIG. 3 is a block diagram showing the structure of the driving signal generator employed in the first embodiment.

As shown in FIG. 2, the controller 8 comprises an engine revolution cycle detecting circuit 10 which detects the cycle of engine revolution through the ignition signal of the engine 2, a reference signal generator 11 which generates a reference signal R related to the vibration of the engine 2 on the basis of the engine revolution cycle detected by the engine revolution cycle detecting circuit 10, amplifiers 12 which amplify the noise signals from the microphones 7-1 to 7-L with a preset gain G2, low-pass filters 13 which filter the low frequency component of the noise signals amplified by the amplifiers 12, A/D convertors 14 which convert the noise signals filtered by the low-pass filters 13 into digital signals, a control sound signal generator 15 which receives the noise signals 6 from the A/D convertors 14 and generates a control sound signal A for driving the speaker 3 on the basis of the noise signals S, a D/A convertor 17 which converts the control sound signal A into an analog signal, a low-pass filter 18 which filters the low frequency component of the control sound signal from the D/A convertor 17, and an amplifier 19 which amplifies the control sound signal filtered by the low-pass pass filter 18 with a present gain G1 and outputs it to the speaker 3.

In the control sound signal generator 15, an adaptive algorithm of Least Mean Square Method is used as an algorithm for generating the control sound signal A. The structure of the control sound signal generator 15 will be described with reference to FIG. 3, hereinbelow. Reference numeral 20 denotes a digital filter which is provided for each of the microphones 7-1 to 7-L and is modeled on the transmission function H (H1 to HL) of the path where the speaker 3 outputs control sound under the control of a control sound signal A output from the control sound signal generator 15. noise in the cabin is changed by the control sound, the change in noise is detected by the corresponding microphone and the noise signal S is input into the control sound signal generator 15. Reference numeral 21 denotes a convergent factor calculating circuit which multiplies the noise signals from each of the microphones by a convergent factor $\alpha$, reference numeral 22 denotes a multiplier which multiplies the reference signal R after passing through the digital filter 20 by the product of the convergent factor $\alpha$ and the noise signal S and reference numeral 23 denotes an adaptive filter whose filter factor is updated on the basis of the output of the multiplier 22 each time the multiplier 22 outputs and which outputs, on the basis of the updated filter factor, a control sound signal A which is reverse to the reference signal R in phase and equal to the same in amplitude.

A first switching circuit 9a is interposed between the microphones 7-1 to 7-L and the convergent factor calculating circuit 21, and a second switching circuit 9b is interposed between the digital filters 20 and the multiplier 22. The first and second switching circuits 9a and 9b are operated by an error scanning circuit 25. In this embodiment, one or more of the microphones 7-1 to 7-L are selected. That is, the microphones disposed in the area where noise is large and the sensitivity of the other microphones is nullified. That is, only the noise signals 8 output from the selected microphones are input into the control sound signal generator 15 and the control sound signal A is generated on the basis of only the noise signals S output from the selected microphones, whereby the amount of calculation to be performed in the controller 8 is reduced. Thus the switching circuits 9a and 9b and the error scanning circuit 25 form the aforesaid sensitivity changing means as indicated at 30 in FIG. 3.

The selection of the microphone will be described, hereinbelow. As an example, the case where the microphones 7-3 and 7-4 on the rear seat (see FIG. 1) are selected will be described here. Assuming that the mean length of the cabin as measured in the longitudinal direction of the vehicle is d(m), the frequency of the primary standing wave generated in the cabin in the longitudinal direction of the vehicle body is f(Hz), the engine speed is r(rpm), the frequency of the secondary component of the engine revolution is f2(Hz) and the acoustic velocity is c(m/s), the frequency of the primary standing wave generated in the cabin in the longitudinal direction of the vehicle body f(Hz) which resonates in the cabin (cavity resonance) is represented by the following formula.

$$f = c/2d \qquad (1)$$

The frequency of the secondary component of the engine noise is represented by the following formula.

$$f2 = r/30 \qquad (2)$$

When the frequencies f and 2f conform with each other, the secondary noise of the engine is amplified by resonance of the cabin and increases in level. That is, as shown by the chained line in FIG. 1, the resonating standing wave has a sound pressure node at the headrest of the front seat and a sound pressure antinode at the rear seat, which results in large noise around the rear seat. The formulae (1) and (2) becomes equal to each other at the following engine speed.

$$r = 15c/d \qquad (3)$$

That is, noise is larger at the rear seat at the engine speed which satisfies the formula (3), and when noise is damped at the rear seat, noise in the whole cabin can be damped without effecting noise damping at the front seat. In other words, noise in the whole cabin can be damped on the basis of only the noise signals output from the microphones 7-3 and 7-4 disposed on the rear seat.

However since the cabin is actually complicated in shape, the similar tendency occurs not only at the engine speed which satisfies the formula (3) but also at engine speeds near the engine speed. Accordingly, allowing a certain latitude in the engine speed, the microphones 7-3 and 7-4 on the rear seat are selected when the engine speed is in the range represented by the following formula, $$15c/d_L \leq r \leq 15c/d_S \qquad (4)$$

wherein $d_L$ represents the maximum length of the cabin and $d_S$ represents the minimum length of the cabin as measured in the longitudinal direction of the vehicle body.

Figure 4:
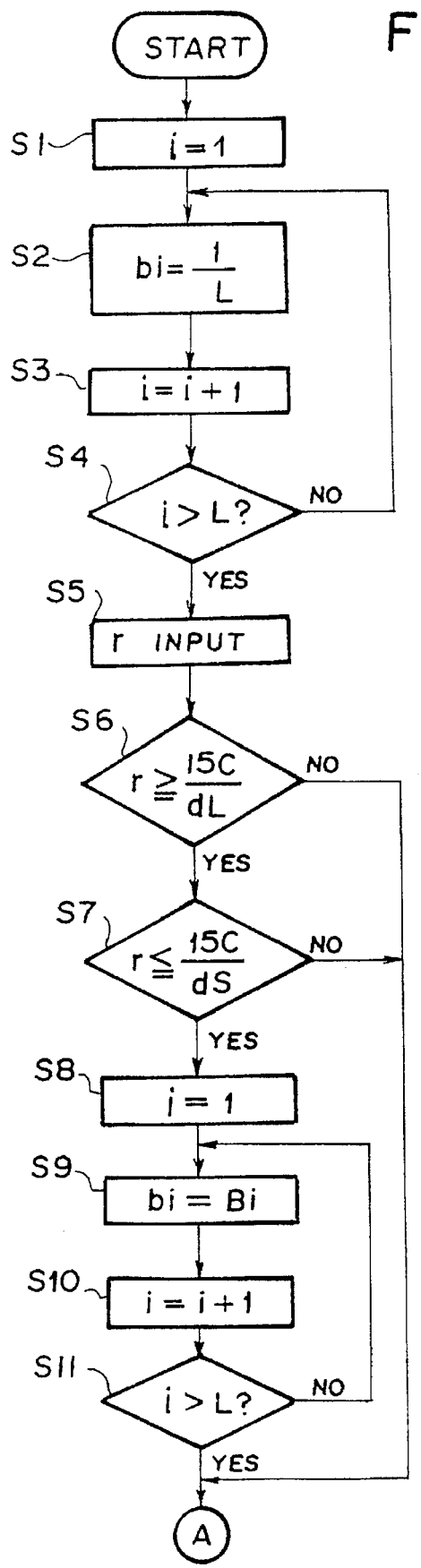
FIGS. 4 and 5 show a flow chart for illustrating the operation of the controller in selection of the microphones.
Figure 5:
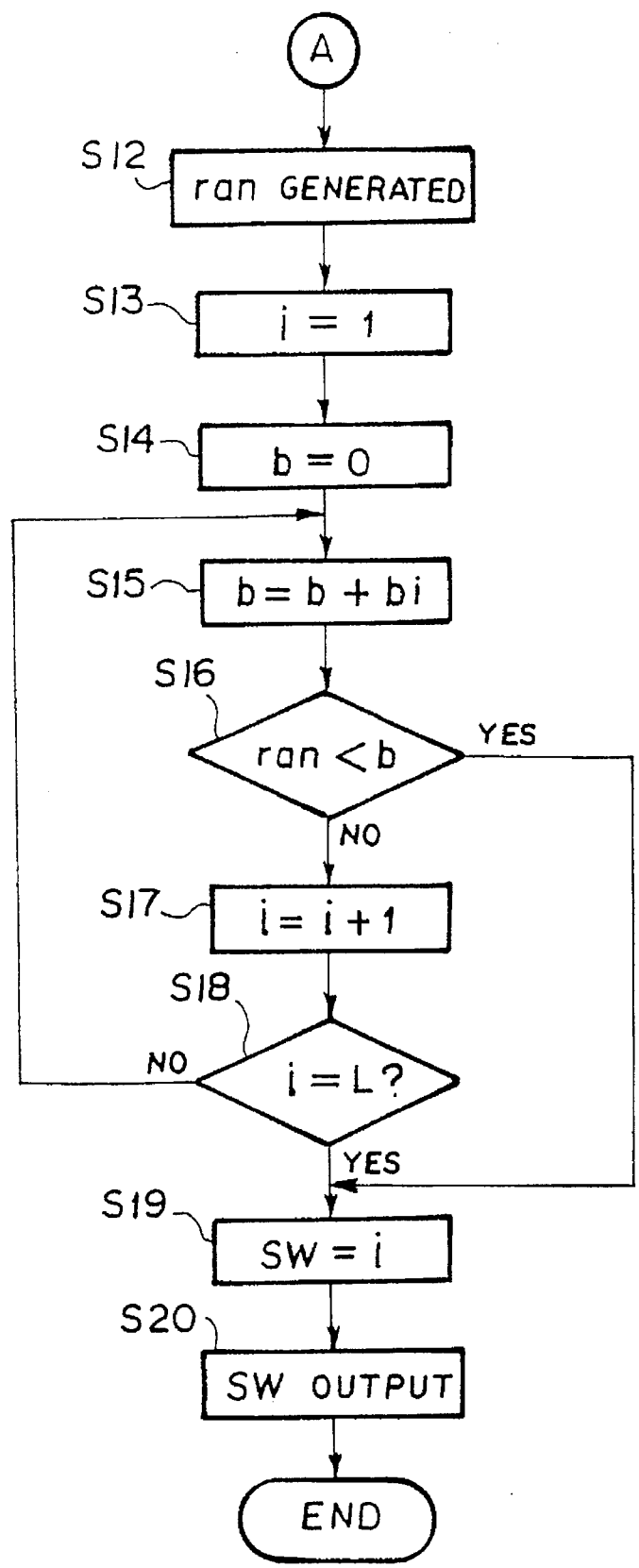

The operation of the controller 8 in selection of the microphones will be described with reference to the flow chart shown in FIGS. 4 and 5, hereinbelow. In this control, the probability that each of the microphones 7-1 to 7-L is selected is set according to the sound pressure mode recognized through the engine speed, and random numbers are generated. On the basis of the random number, the microphones to be used in noise damping is selected. In the flow chart, b1 to bL respectively represent the probabilities that the microphones 7-1 to 7-L are selected, B1 to BL respectively represent the probabilities that the microphones 7-1 to 7-L are selected when a particular condition, e.g., the formula (4), is satisfied, and SW represents a switching command for the switching circuits 9a and 9b. For example when SW is set to 1, the noise signal from the microphone 7-1 is read. Further, "ran" is a random number wherein $0 \leq ran \leq 1$.

The controller 8 first determines initial values 1/L of the probabilities that the respective microphones 7-1 to 7-L are selected. (steps S1 to S4) That is, initially the probabilities that the respective microphones 7-1 to 7-L are selected are set to be equal to each other.

Then the controller 8 determines whether the formula (4) has been satisfied. (steps S5 to S7) When it is determined that the formula (4) has been satisfied, the controller 8 proceeds to step S8, and otherwise the controller 8 directly proceeds to S12.

In steps S8 to S11, the controller 8 substitutes the probabilities B1 to BL that the microphones 7-1 to 7-L are selected when the formula (4) is satisfied for the initial values of the probabilities b1 to bL that the microphones 7-1 to 7-L are selected (1/L). The values of the probabilities B1 to BL are set in advance according to the condition satisfied. In this case, since the microphones 7-3 and 7-4 are to be selected when the formula (4) is satisfied, the probabilities that the microphones 7-3 and 7-4 are selected has been set to be 0.5 and the probabilities that the other microphones 7-1, 7-2, and 7-5 to 7-L are selected have been set to be 0.

After the probabilities that the respective microphones are selected are set according to the condition satisfied in this manner, the controller 8 generates a random number ran between 0 and 1. (step S12) Then the controller 8 sets i to 1 and sets b to 0. (steps S13 and S14) In step S15, the controller 8 adds bi (b1) to b (b=b+bi) and in step S16, the controller 8 compares the value of the b with the random number ran. When it is determined that the random number ran is not smaller than b, the controller 8 adds 1 to i (i=i+1). (step S17) Then the controller 8 determines in step S18 whether i=L. The controller 8 repeats steps S15 to S18 while adding the values of the probabilities b one by one until the sum of the values of the probabilities b becomes larger than the random number ran (when it is determined in step S16 that the random number ran is smaller than b) or it is determined in step S18 that i-L.

When it is determined in step S16 that the random number ran is smaller than b or it is determined in step S18 that i=L, the controller 8 sets the switching command SW for the switching circuits 9a and 9b to the value of i at that time. (step S19) Then the controller 8 outputs a signal which turns on only the switch in the switching circuits 9a and 9b which corresponds to the value of i at that time. (step S20) That is, only the noise signal from the microphones 7-i corresponding to the value of i at that time is input into the control sound signal generator 15.

In order to facilitate understanding the flow of steps S12 to S20, description will be made assuming that L=4, that is, the number of the microphones are only four, the microphones 7-1 and 7-2 positioned on the front seat and the microphones 7-3 and 7-4 positioned on the rear seat. In this case, the probabilities b1 and b2 that the microphones 7-1 and 7-2 are selected have been set to 0 and the probabilities b3 and b4 that the microphones 7-3 and 7-4 are selected have been set to 0.5 in the preceding steps S8 to S11. For example when a random number ran of 0.3 is generated in step S12, the probability b1 is added to b (0) in step S15 after steps S13 and S14. Since the value of b1 has been set to 0, the sum of b and b1 is 0 at this time. Accordingly the answer to the question in step S16 is NO, and i is set to 2 in step S17. Thus the controller 8 returns to S15 after step S18, and the probability b2 is added to b. Since the value of b2 has been set to 0, the sum of b and b2 is 0 at this time. Then the controller 8 again returns to step S15 after steps S16 to S18, and at this time, the value of b3 is added to b. Since the value of b3 has been set to 0.5, the sum of b and b3 is 0.5 at this time. Accordingly, the value of b (0.5) becomes larger than the random number ran (0.3) and the answer to the question in step S16 turns to YES at this time. Then the switching command SW for the switching circuits 9a and 9b is set to 3 in step S19. Then the controller 8 outputs a signal which turns on the switch in the switching circuits 9a and 9b which corresponds to the microphone 7-3. (step S20) That is, only the noise signal from the microphone 7-3 is input into the control sound signal generator 15.

Further, when, for instance, a random number ran of 0.7 is generated in step S12, the answer to the question in step S16 does not become YES until the value of b4 is added in step S15. Accordingly, at this time the switching command SW for the switching circuits 9a and 9b is set to 4, and only the noise signal from the microphone 7-4 is input into the control sound signal generator 15.

Thus in this embodiment, the noise signals from the unnecessary microphone are not input into the control sound signal generator 15, and accordingly, the amount of calculation to be performed by the controller 8 is greatly reduced, which results in quick calculation of the control sound signal and high response to control.

Though, in the embodiment described above, the probabilities that the microphones other than the microphones 7-3 and 7-4 are selected is set to 0, they may be set to a relatively low value such as 0.1 so that the noise in the parts in the cabin other than the rear seat is intermittently detected. Further as can be understood from FIG. 1, since the noise is substantially large also at the front end portion of the cabin when the noise at the rear seat is large, the noise signal from the microphones at the front end portion of the cabin may be input into the control sound signal generator 15.

MODIFICATION

A modification of the first embodiment described above will be described, hereinbelow. Though in the first embodiment description was made in conjunction with the case where the noise at the rear seat is large, in this modification, conditions are set to react other noise modes.

Figure 6:
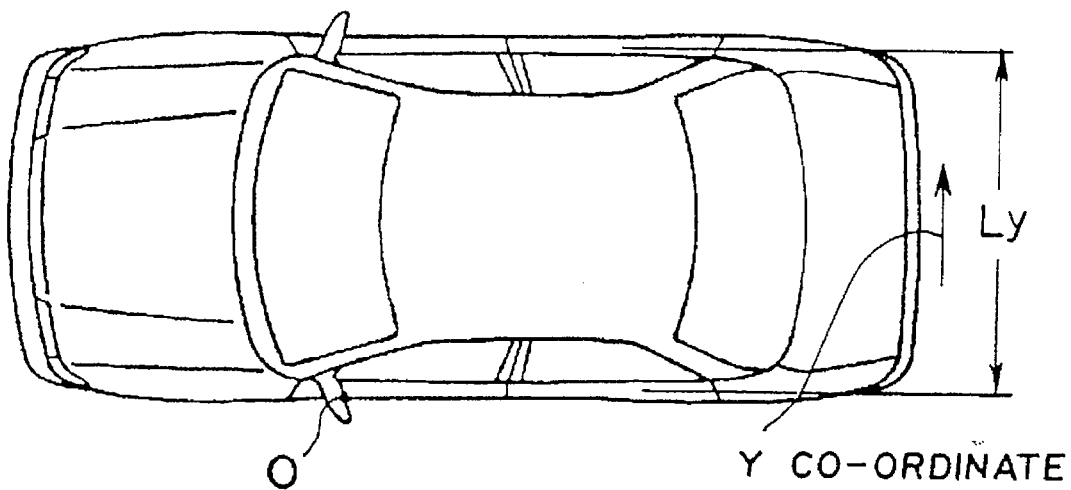
FIG. 6 is a schematic plan view showing a vehicle provided with a vibration damping system in accordance with a modification the first embodiment.
Figure 7:
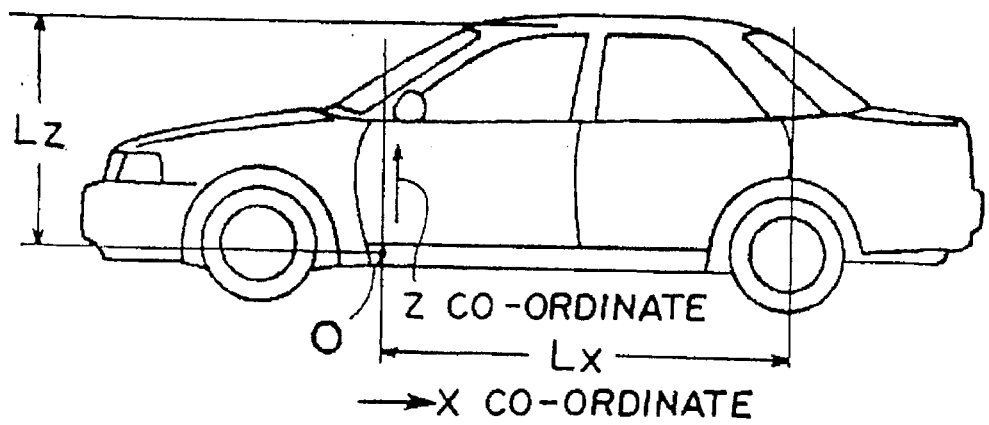
FIG. 7 is a schematic side view of the vehicle.

As shown in FIGS. 6 and 7, the cabin is considered to be a space in a three-dimensional (X, Y, Z) coordinate system with the origin O at the left front end of the cabin. When the mode degree of the noise in the direction of X-axis (in the longitudinal direction of the vehicle body) is represented by nd, the mode degree of the noise in the direction of Y-axis (in the transverse direction of the vehicle body) is represented by ny, the mode degree of the noise in the direction of Z-axis (in the vertical direction of the vehicle body) is represented by nz, the frequency of the noise in mode (nd, ny, nz) is represented by fn(Hz), the engine speed is represented by r(rpm), the frequency of secondary noise of the engine is represented by fn(Hz), the acoustic velocity is represented by c(m/s), the length of the cabin in the longitudinal direction of the vehicle body is represented by Lx, the length of the cabin in the transverse direction of the vehicle body is represented by Ly and the length of the cabin in the vertical direction of the vehicle body is represented by Lz, coordinates (X, Y, Z) of the position where the microphone is to be provided for a typical mode of the secondary noise of the engine have a relation given by the following formula.

$$\cos(nd\pi X/Lx) \cos(ny\pi Y/Ly) \cos(nz\pi Z/Lz)=1 \quad (5)$$

The frequency fn of noise having an antinode in the position of the microphone is given by the following formula.

$$fn=(c/2)\{(nd/Lx)^2+(ny/Ly)^2+(nz/Lz)^2\}^{1/2} \quad (6)$$

The frequency f2 of the secondary component of the engine noise is given the following formula.

$$f2=r/30 \quad (7)$$

The engine speed r at which fn is equal to f2 is given by the following formula.

$$f=15c\{(nd/Lx)^2+(ny/Ly)^2+(nz/Lz)^2\}^{1/2} \quad (8)$$

Accordingly, when the engine is operating at the engine speed given by the formula (8) or the engine speed near thereto, noise in the whole cabin can be damped by inputting the noise signal output from the microphone disposed in the position defined by co-ordinates (X, Y, Z) having the relation given the formula (5). Also in this case, the noise signals from the microphones disposed other position may be intermittently input into the control sound signal generator 15.

Figure 8:
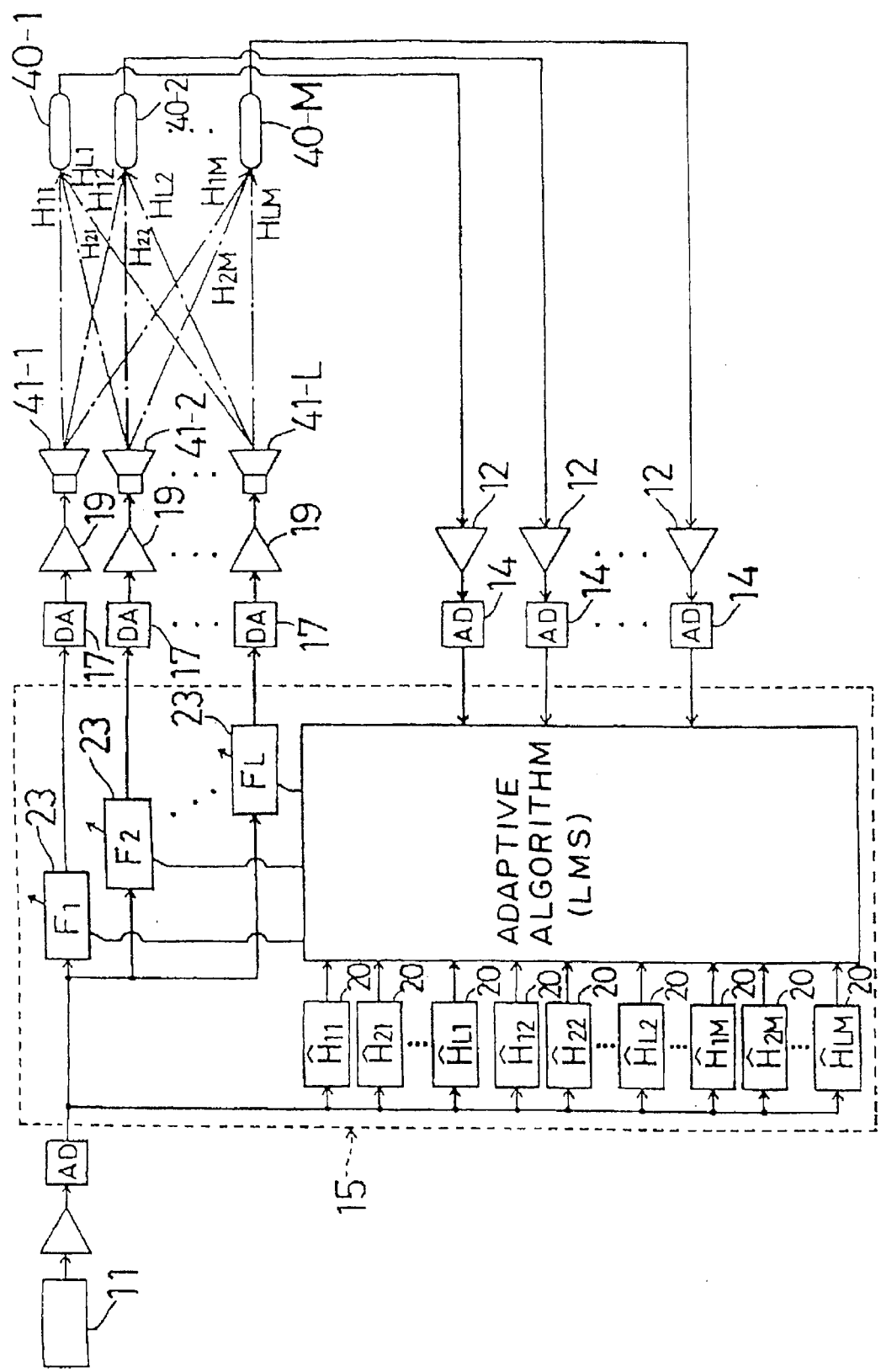
FIG. 8 is a block diagram showing a modification of the controller employed in the first embodiment.

FIG. 8 shows another modification where a plurality of speakers are provided. In FIG. 8, microphones to the number of M (40-1, 40-2, . . . , 40-M) are provided in a plurality of positions in the cabin and speakers to the number of L (41-1, 41-2, . . . , 41-L) are provided in a plurality of positions in the cabin. Further a plurality of digital filters 20 which are respectively modeled on the transmission characteristics $H_{11}$ to $H_{LM}$ between the speakers 41-1, 41-2, ..., 41-L and the microphones 40-1, 40-2, ..., 40-M, adaptive filters 23 to the number of L, D/A convertors 17 to the number of L, output side amplifiers 19 to the number of L, A/D convertors 14 to the number of M and input side amplifiers 12 to the number of M are provided. The arrangement of the other parts are the same as those shown in FIGS. 2 and 3, and accordingly, the analogous parts are given the same reference numerals and will not be described here.

Though, in the embodiments described above, the speaker 3 is employed as the actuator and the microphone 7 is employed as the vibration sensor, the combination of an engine mount (to be described later) and the microphone or the combination of the engine mount and an acceleration (to be described later) may be employed. Further both the engine mount and the speaker may be provided as the actuators, and both the microphone and the acceleration may be provided as the vibration sensors. It is preferred that the acceleration sensor be disposed various portions which can vibrate such as on a floor panel, a door inner panel, a shift lever and the like.

A second embodiment of the present invention will be described, hereinbelow.

Figure 9:
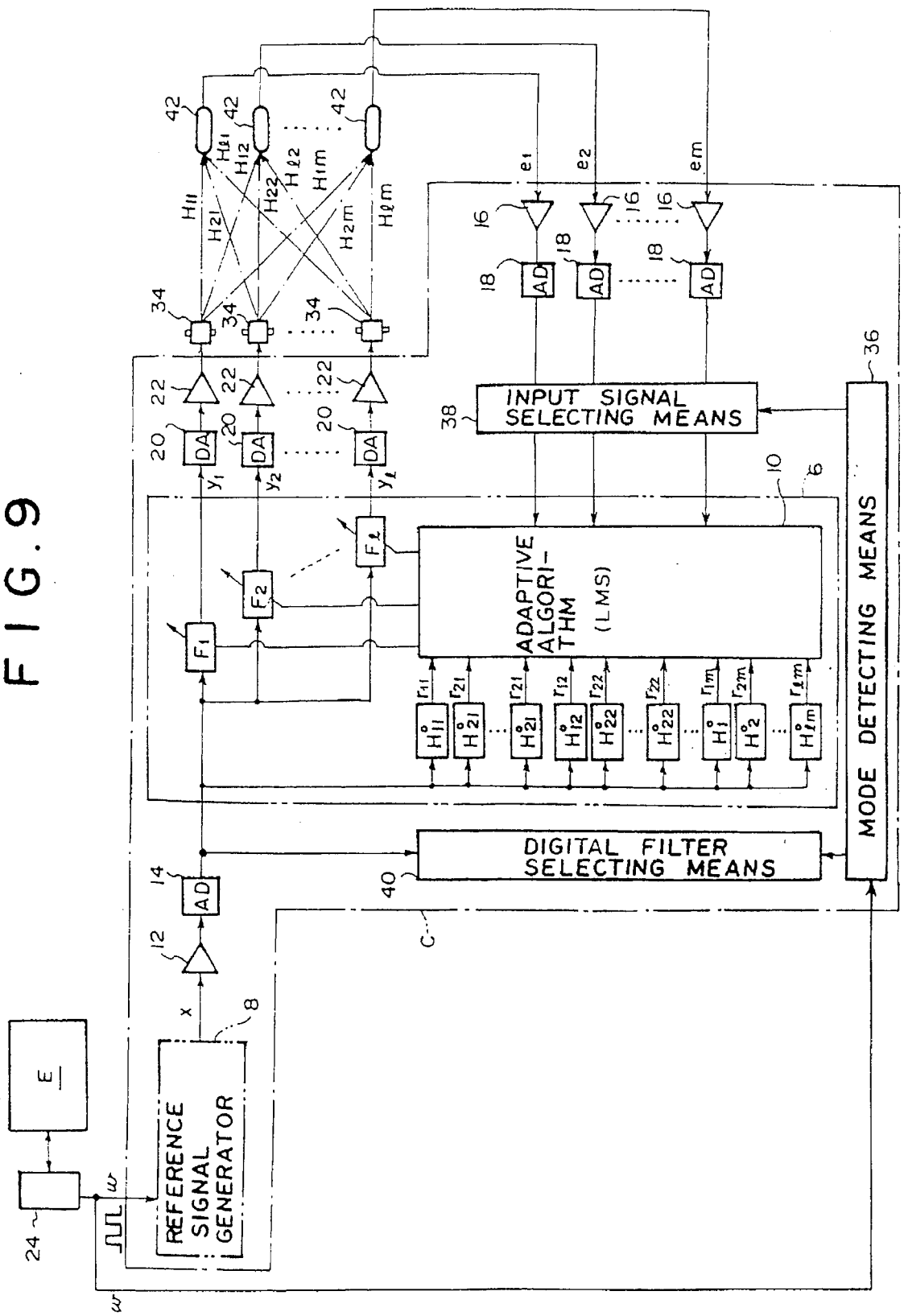
FIG. 9 is a schematic view showing a vibration damping system in accordance with a second embodiment of the present invention.
Figure 10:
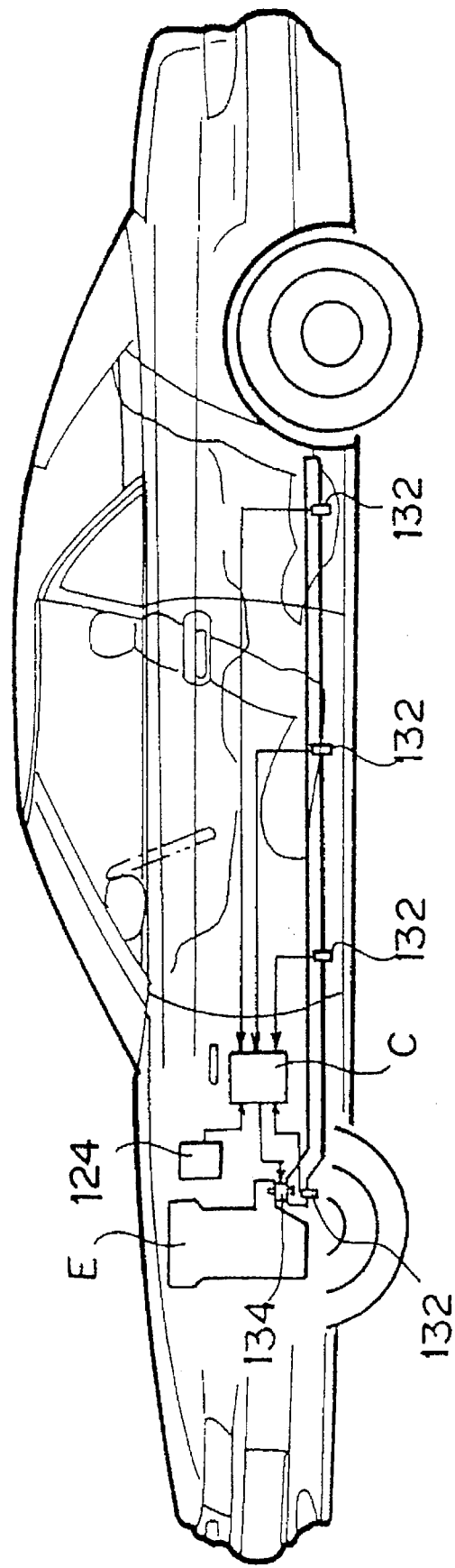
FIG. 10 is a schematic view showing the mounting position of the vibration damping system.

FIG. 9 is a schematic view showing a vibration damping system in accordance with a second embodiment of the present invention, and FIG. 10 is a schematic view showing the mounting position of the vibration damping system. The vibration damping system of this embodiment is for the purpose of damping mainly the vibration of the vehicle body whereas the first embodiment is for the purpose of damping mainly noise in the cabin. The vibration damping system of this embodiment comprises m-number of acceleration sensors 132 (four of them are shown in FIG. 10) provided on the vehicle body in a plurality of positions, i-number of engine mounts 134 (one of them is shown in FIG. 10) which are interposed between an engine E and function as the actuator for generating control vibration for vibration damping and a controller C for driving the engine mounts 134.

As shown in FIG. 9, the controller C comprises a reference signal generator 108 which generates a reference signal x on the basis of an ignition pulse signal w output from an ignition coil 124, and a driving signal generator 106 which generates driving signals y1 to yi for driving the respective actuators 134 on the basis of the reference signal x. The driving signal generator 106 comprises i-number of digital filters F1 to Fi through which the reference signal x is passed to obtain the driving signals y1 to yi and an adaptive algorithm section 110 which regulates the respective digital filters F1 to Fi to minimize error signals (vibration signals) $e_1$ to $e_m$ output from the acceleration sensors 132, which detect the vibration-to-be-damped generated due to the engine revolution together with the vibration generated by the actuators 134. In this embodiment an adaptive algorithm of Least Mean Square Method is used as an algorithm for generating the driving signal. For this purpose, the driving signal generator 106 is provided with digital filters $H^a{}_{IM}$ which are modeled on the transmission characteristics $H_{IM}$ (I=1, 2, ..., i; M=1, 2, ..., m) between the respective actuators 134 and the respective acceleration sensors 132. Further the controller C is further provided with an amplifier 112 which amplifies the reference signal x, an A/D convertor 114 which converts the reference signal x to a digital signal, D/A convertors 120 which respectively convert the driving signals y1 to yi to analog signals, amplifiers 122 which respectively amplify the driving signals y1 to yi, amplifiers 116 which respectively amplify the error signals $e_1$ to $e_m$, and A/D convertors 118 which respectively convert the error signals $e_1$ to $e_m$ to digital signals.

In this embodiment, a mode detecting means 136 for detecting the vibration mode of the vehicle, and an input signal selecting means 138 (as the sensitivity changing means) which selectively inputs the error signals $e_1$ to $e_m$ from the respective acceleration sensors 132 into the driving signal generator 106. The mode detecting means 136 and the input signal selecting means 138 will be described in detail hereinbelow. The following table 1 is a two-dimensional map which shows the correspondence of the engine speeds to the vibration modes of the vehicle and the following table 2 is a two-dimensional map which shows the correspondence of the vibration modes of the vehicle to input signal selection modes.

TABLE 1

| engine speed | vibration mode |
|---|---|
| R1 | vibration mode 1 |
| R2 | vibration mode 2 |
| : | : |
| Rn | vibration mode n |

TABLE 2

| vibration mode | input signal selection mode |
|---|---|
| vibration mode 0 | selection mode 0 |
| vibration mode 1 | selection mode 1 |
| vibration mode 2 | selection mode 2 |
| : | : |
| vibration mode n | selection mode n |

The mode detecting means 136 calculates the speed of the engine E on the basis of the ignition pulse signal w output from the ignition coil 124 and detects the vibration mode of the vehicle on the basis of the engine speed. The vibration mode of the vehicle can be detected on the basis of the engine speed, for instance, by experimentally detecting in advance the engine speed at which resonance occurs due to the engine vibration transmitted to the vehicle body and/or the vibration mode of the vehicle when resonance occurs and storing the relation between the engine speed and the vibration mode of the vehicle in a two-dimensional map such as shown in table 1. The engine speed may be detected in various known ways without using the ignition pulse signal w.

The input signal selecting means 138 selects one or more of the error signals $e_1$ to $e_m$ from the acceleration sensor 132 every sampling cycle and inputs it or them to the driving signal generator 106. Selection of the error signals $e_1$ to $e_m$ is performed, for instance, in the following manner. Suitable selecting methods are determined for respective vibration modes of the vehicle body and stores them in a two-dimensional map such as shown in table 2. In table 2, the vibration mode 0 means the condition where the mode detecting means 136 detects no vibration mode of the vehicle body, that is, where no resonance occurs in the vehicle body. The input signal selection mode 0 means to select one or more of the error signals $e_1$ to $e_m$ so that each of the error signals $e_1$ to $e_m$ is uniformly selected, for instance to select one of the error signals $e_1$ to $e_m$ in regular order every sampling cycle. The other vibration modes mean various condition where resonance occurs in the vehicle body, and the input signal selection modes for the respective vibration modes mean the methods of selecting the error signals $e_1$ to $e_m$ so that the error signals bearing thereon vibration information which is useful for the respective vibration modes are selected at a higher rate. Assuming that a first one of the acceleration sensors 132 is disposed nearest to an antinode of the vibration currently generated, it is considered that the error signal $e_1$ from the first acceleration sensor 132 is the most useful and the selection of the error signals $e_1$ to $e_m$ is performed in the manner in which the rate at which the error signal $e_1$ is selected is increased. The rate at which the error signal $e_1$ is selected can be increased, for instance, by selecting the error signal $e_1$ every other sampling cycle and selecting the other error signals $e_2$ to $e_m$ in regular order at intervals therebetween, or by selecting solely the error signal $e_1$.

By selecting the error signal(s) useful to the detected vibration mode at a higher rate, the resonance can be quickly damped.

In this embodiment, since an adaptive algorithm of Least Mean Square Method is employed, there is provided a digital filter selecting means 140 which selects a digital filter $H°$ through which the reference signal x is to be passed in synchronization with the input signal selecting means 138. That is, the digital filter selecting means 140 selects one of the digital filters $H°$ adaptive to the error signal selected by the input signal selecting means 138 every sampling cycle in synchronization with the input signal selecting means 138 and causes the reference signal x to pass the selected digital filter $H°$.

The selected error signal selected by the input signal selecting means 138 is input into the driving signal generator 106, and the adaptive algorithm section 110 in the driving signal generator 106 regulates the parameters of the digital filters F1 to Fi every moment so that the error signals input every sampling time is minimized. The reference signal x passing through the digital filter is converted into a driving signal and drives the corresponding engine mount 132 to generate the control vibration.

Figure 11:
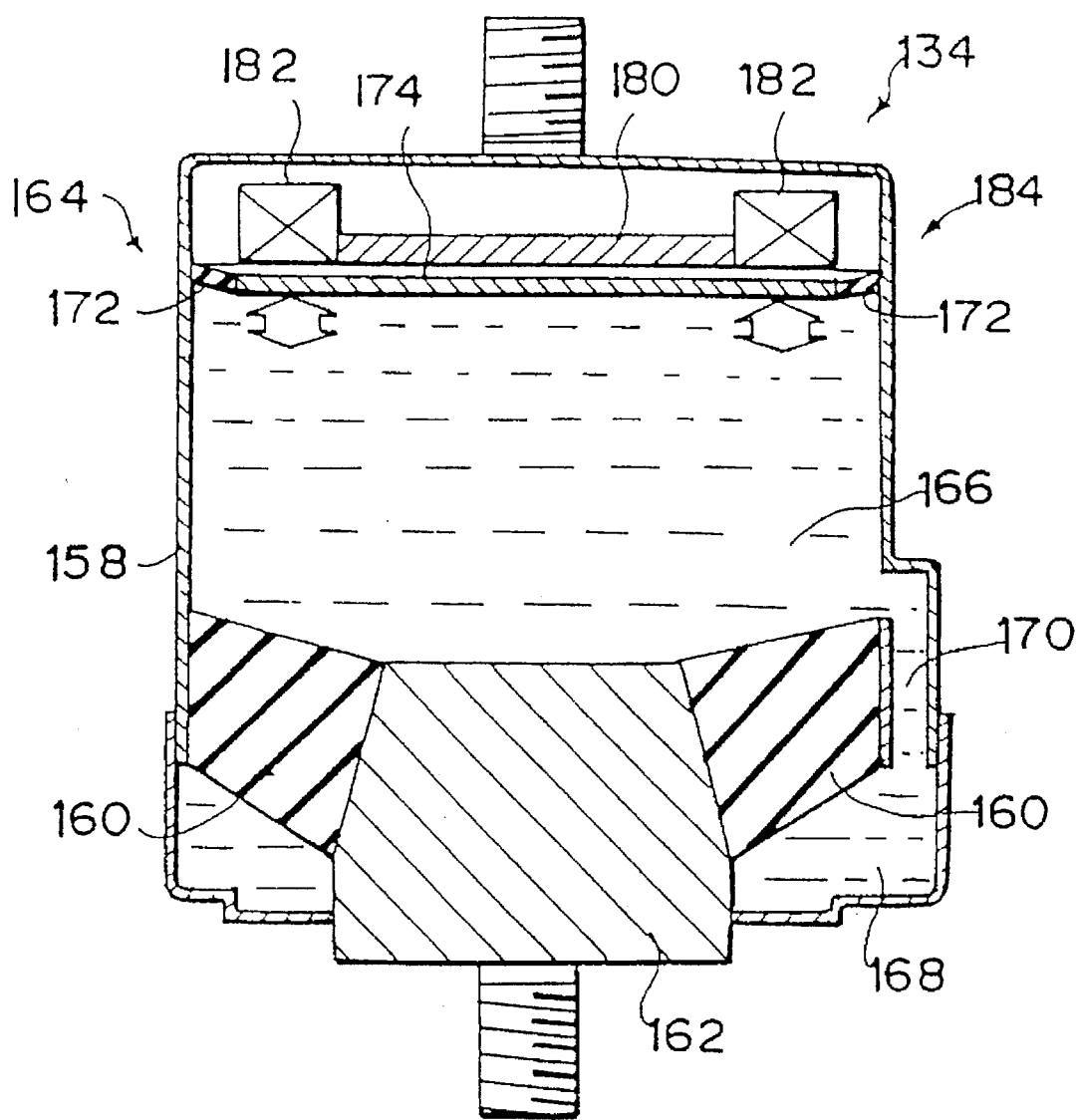
FIG. 11 is a schematic cross-sectional view showing the structure of the engine mount.

As shown in FIG. 11, the engine mount 134 comprises a cylinder 162 which is mounted in a casing 158 by way of rubber member 160 to be movable up and down in the casing 158, and a vibrating portion 164 provided above the cylinder 162. The space in the casing 158 is divided into upper and lower chambers 166 and 168 by the cylinder 162, and the upper and lower chambers 166 and 168 are communicated with each other by an orifice 170. The upper and lower chambers 166 and 168 are filled with liquid. The vibrating portion 164 comprises a vibrating plate 174 mounted in the casing 158 by way of a rubber member 172 to be movable up and down, and a solenoid portion 184 comprising a permanent magnet 180 and a winding 182.

In the engine mount 134, the vibrating portion 164 vibrates driven by the driving signal (y1 to yi) to vibrate the cylinder 162, thereby damping the vibration-to-be-damped.

Figure 12:
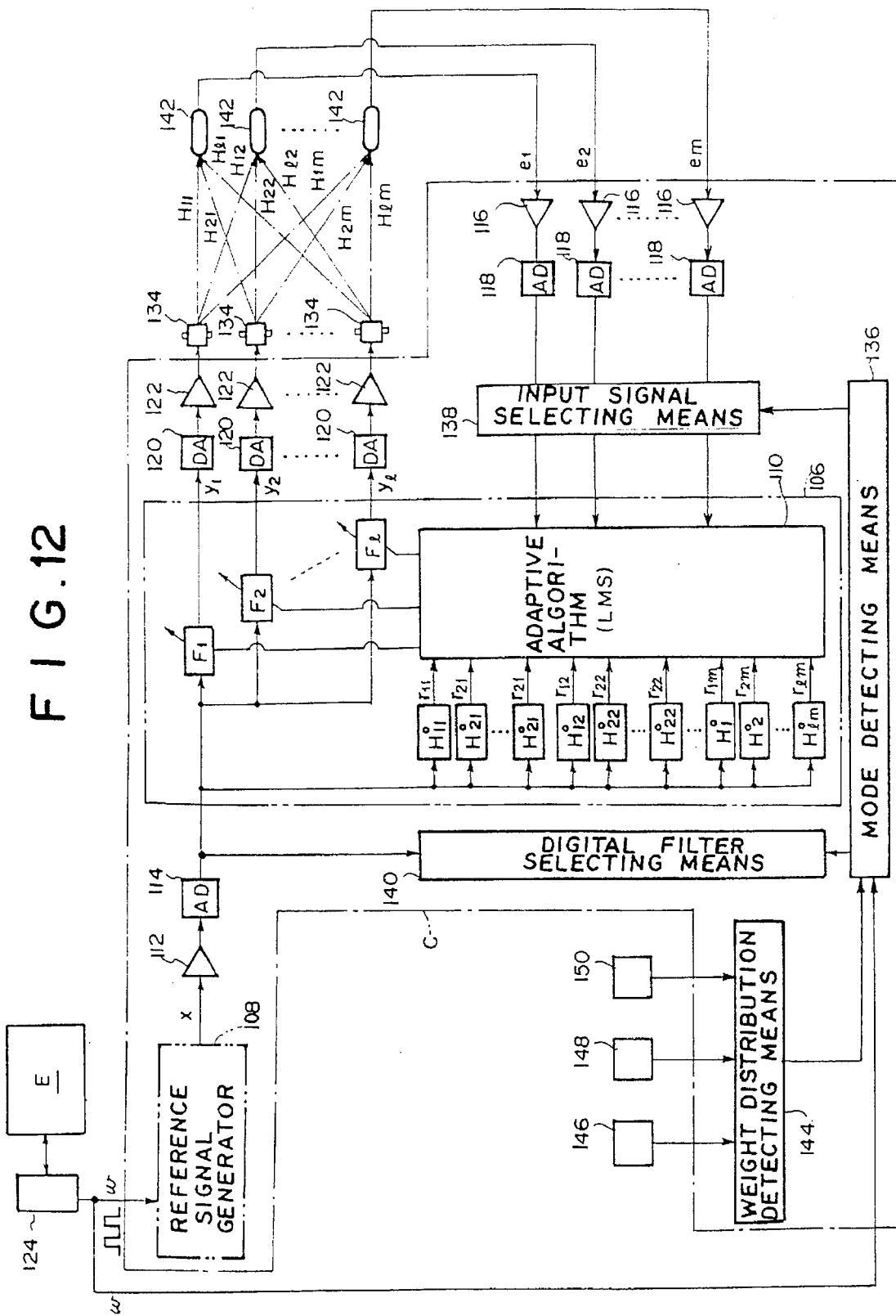
FIG. 12 is a schematic view showing a vibration damping system in accordance with a third embodiment of the present invention.
Figure 13:
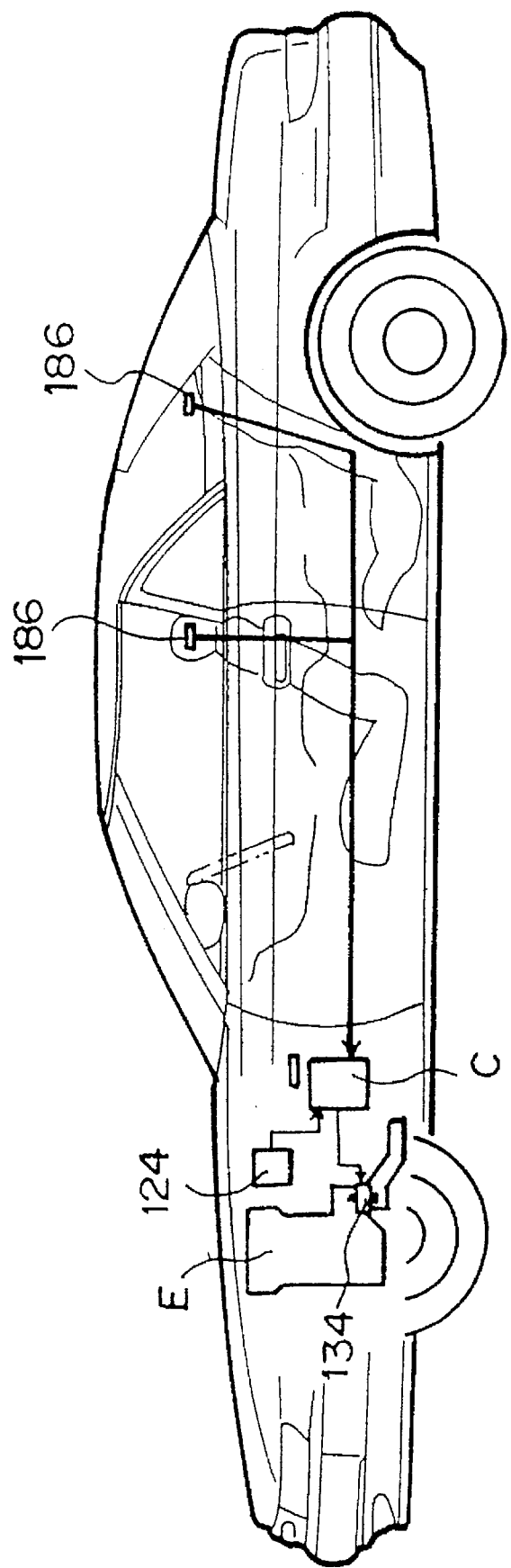
FIG. 13 is a schematic view showing the mounting position of the vibration damping system.

Now a third embodiment of the present invention will be described with reference to FIGS. 12 and 13, hereinbelow. The parts analogous to the parts described in conjunction with the second embodiment are given the same reference numerals and will not be described here.

This embodiment differs from the second embodiment in the vibration sensor and the method of detecting the vibration mode of the vehicle body and accordingly description will be made mainly in conjunction therewith. In this embodiment, m-number of microphones 186 are disposed (as vibration sensors) near the seats in the cabin. It is preferred that the microphones 186 be disposed near the ears of the passengers seated on the seats. That is, in this embodiment, noise (vibration of air) generated near the seats due to engine vibration is damped by i-number of engine mounts 134.

In this embodiment, the vibration mode of the vehicle body is detected taking into account the weight distribution on the vehicle body in addition to the engine speed. That is, as shown in FIG. 13, the controller C has therein a weight distribution detecting means 144 for detecting the weight distribution on the vehicle body, and the mode detecting means 136 calculates the speed of the engine E on the basis of the ignition pulse signal w output from the ignition coil 124 and detects the vibration mode of the vehicle on the basis of the engine speed as well as the weight distribution detected by the weight distribution detecting means 144. The vibration mode of the vehicle body is detected, for instance, in the following manner.

FIG. 14 is a three-dimensional map showing correspondences of the vibration mode of the vehicle body to the engine speed and the weight distribution mode on the vehicle body.

A plurality of weight distribution modes are set in advance according to the combinations of the number of passengers, the seats occupied, the amount of fuel in the reservoir and the like. The engine speed at which resonance (cavity resonance) occurs due to the engine vibration transmitted to the vehicle body for given weight distribution modes and/or the vibration mode of the vehicle when resonance occurs are experimentally detected and the correspondences of the vibration mode of the vehicle body to the engine speed and the weight distribution mode on the vehicle body are stored in a three-dimensional map such as shown in FIG. 14. The mode detecting means 135 detects the vibration mode of the vehicle body on the basis of the engine speed and the weight distribution mode detected by the weight distribution detecting means 144 according to the three-dimensional map. The weight distribution detecting means 144 determines the weight distribution mode on the basis of detecting signals from a seated seat sensor 146, a suspension stroke sensor 148, a fuel gauge 150 and the like.

Figure 15:
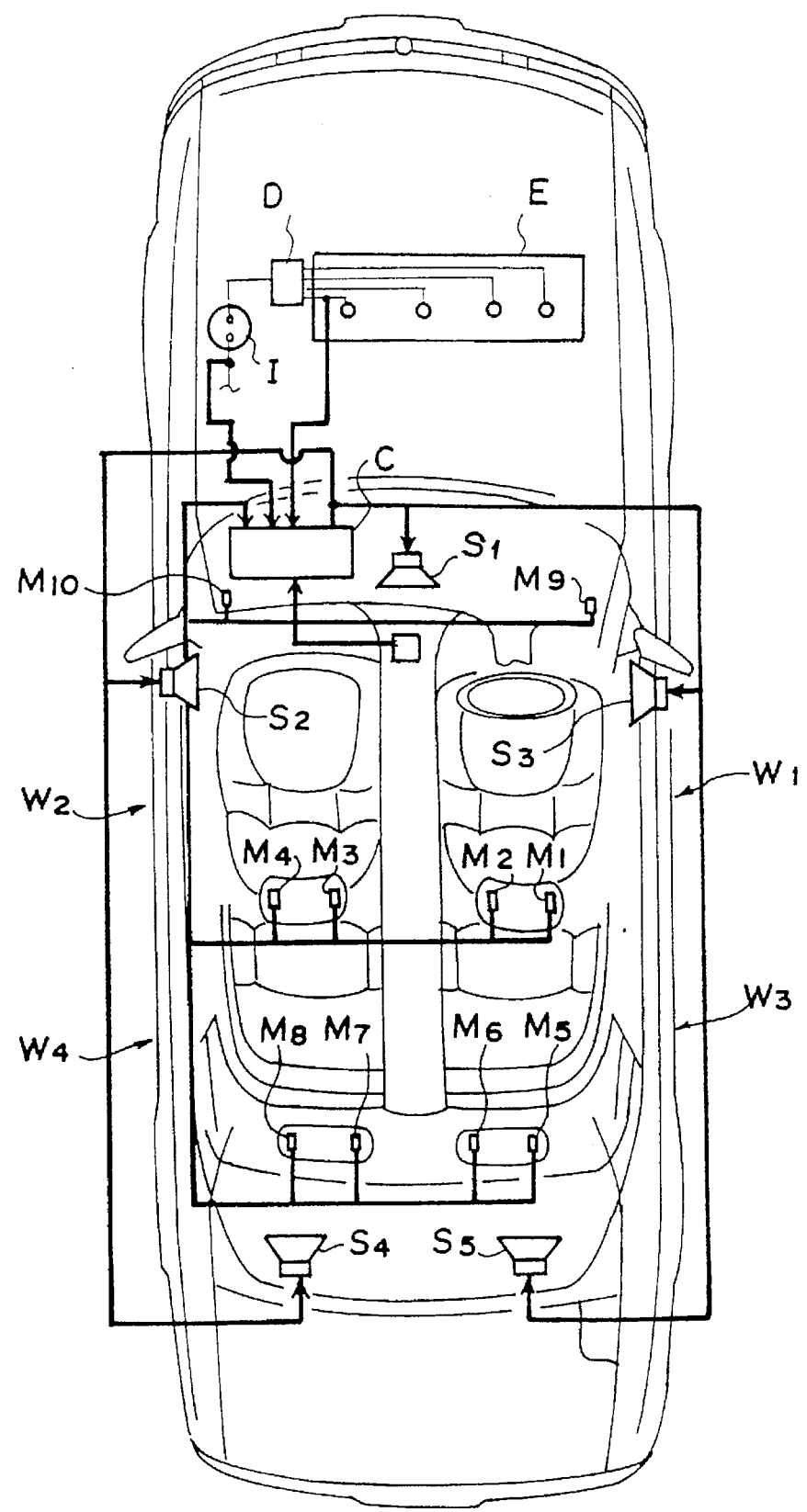
FIG. 15 is a schematic view showing a vehicle provided with a vibration damping system in accordance with fourth embodiment of the present invention.

A fourth embodiment of the present invention will be described with reference to FIGS. 15 to 17, hereinbelow. FIG. 15 is a schematic view showing a vehicle provided with a vibration damping system of this embodiment, FIG. 16 is a block diagram showing the structure of the controller employed in the vibration damping system, and FIG. 17 is a block diagram showing the structure of the control means shown in FIG. 16.

As shown in FIG. 15, the vibration damping system of this embodiment has ten microphones M1 to M10 as the vibration sensors and five speakers S1 to S5 as the actuators. Noise in the cabin is detected by the microphones M1 to M10 and the noise detected is damped by driving the speakers S1 to S5. In FIG. 15, E denotes an engine, D denotes a distributor, I denotes an ignition coil and C denotes a controller. Vibration signals out from the microphones M1 to M10 are input into the controller C and the controller C output driving signals for driving the speakers S1 to S5. An ignition pulse signal is input into the controller C.

Figure 16:
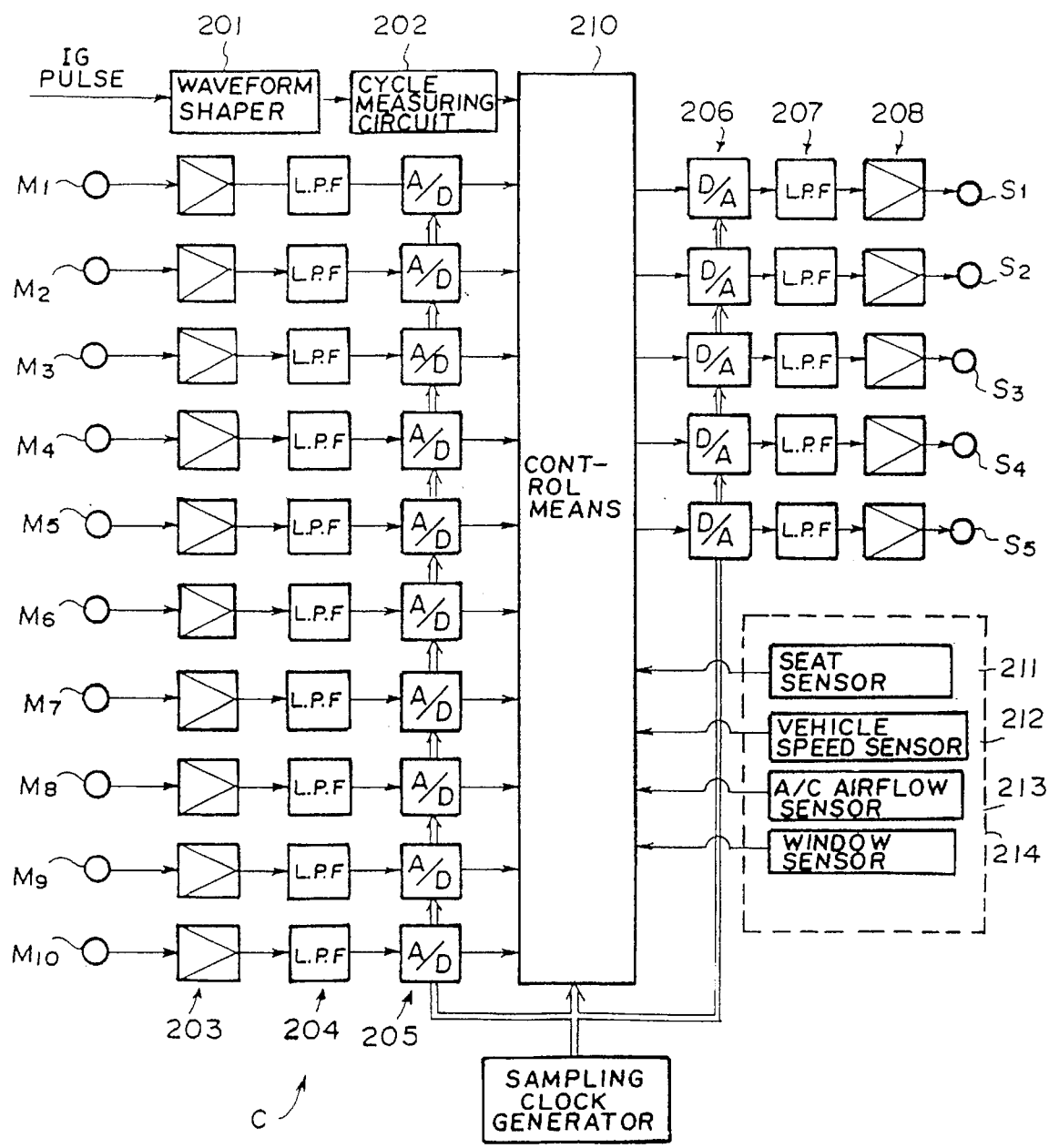
FIG. 16 is a block diagram showing the structure of the controller employed in the vibration damping system.

As shown in FIG. 16, the controller C comprises an waveform shaper 201 which shapes the waveform of the ignition pulse signal, a cycle measuring circuit 202 which measures the revolution cycle of the engine E on the basis of the signal output from the waveform shaper 201, amplifiers 203 which amplify the vibration signals from the microphones M1 to M10, low-pass filters 204 which filter the amplified vibration signals, and A/D convertors 205 which convert the filtered analog signals into digital signals and input them into a control means 210. The controller C is further provided with D/A convertors 206 which convert the digital signals output from the control means 210 into analog signals, low-pass filters 207 which filter the analog signals, and amplifiers 208 which amplify the filtered analog signals and input into the speakers S1 to S5. Seating detecting signals from seat sensors 211 provided for the respective seats in the cabin, a vehicle speed signal from a vehicle speed sensor 212, conditioned-air-flow signal from an conditioned-air-flow sensor 213, a window opening detecting signals from window sensors 214 which detect whether the windows are opened or closed are input into the control means 210. Reference numeral 215 in FIG. 16 denotes a sampling clock generator.

Figure 17:
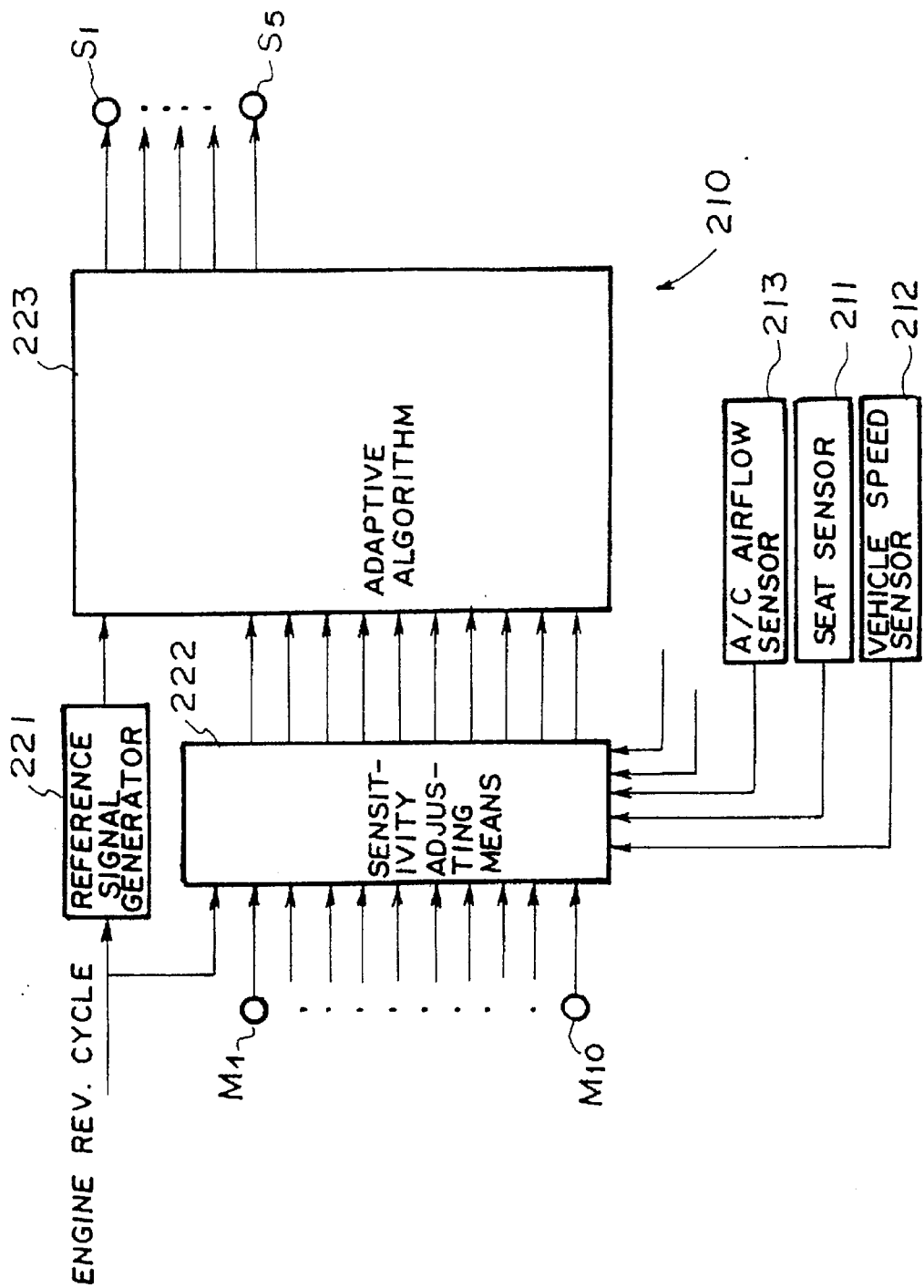
FIG. 17 is a block diagram showing the structure of the control means shown in FIG. 16.

As shown in FIG. 17, the control means 210 comprises a reference signal generator 221 which generates a reference signal on the basis of the output signal of the cycle measuring circuit 202, a sensitivity adjusting means 222 which adjusts the sensitivities of the respective microphones M1 to M10 by adjusting the vibration signals from the microphones M1 to M10, and an adaptive algorithm section 223 which generates driving signals for driving the speakers S1 to S5 on the basis of the reference signal and the vibration signals adjusted by the sensitivity adjusting means 222. The sensitivity adjusting means 222 adjusts the vibration signals from the microphones M1 to M10 according to the engine revolution cycle, the vehicle speed, the position of the passengers, the airflow of the air-conditioner, and the like.

Change of the sensitivities of the microphones M1 to M10 by the sensitivity adjusting means will be described, hereinbelow.

Figure 18:
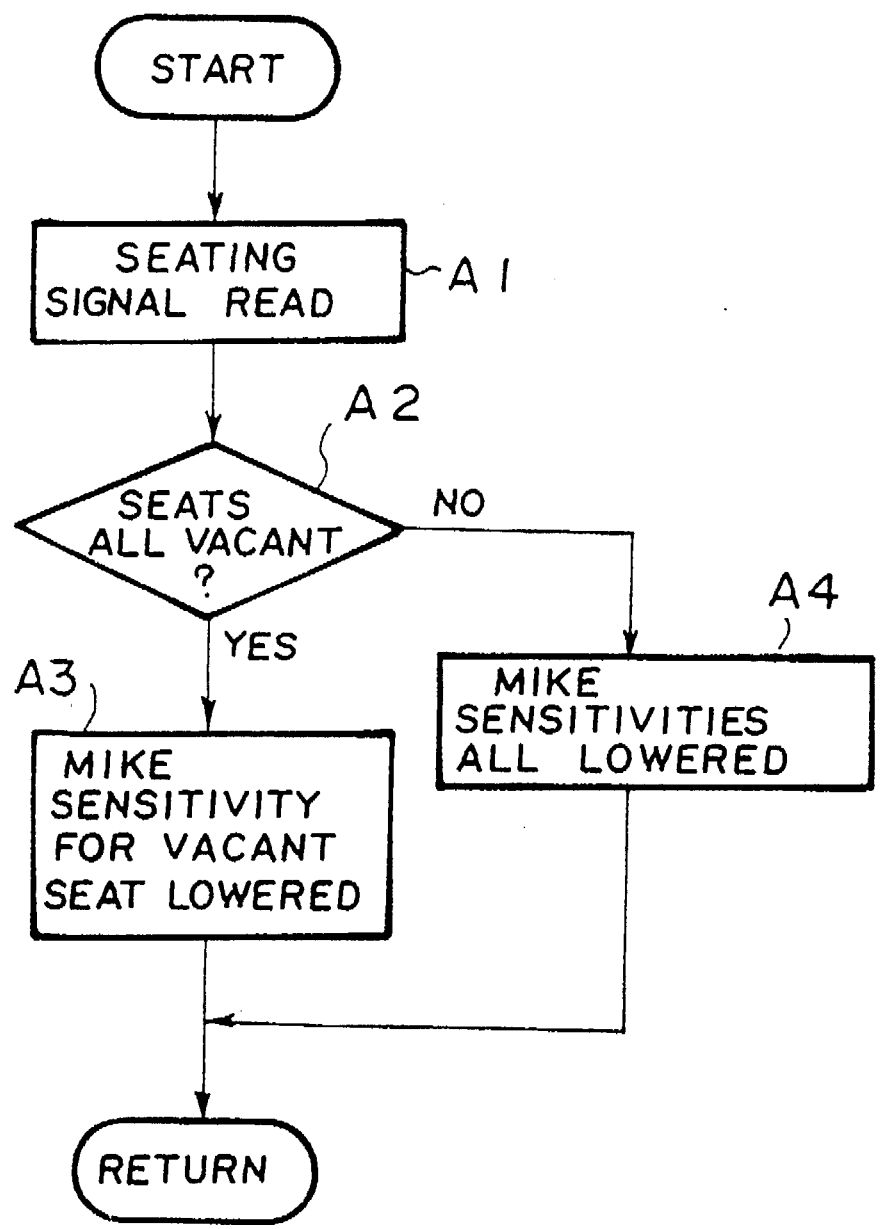
FIG. 18 is a flow chart for illustrating the operation of the controller when changing the sensitivities of the microphones according to the position of the passengers.

FIG. 18 shows the flow chart for illustrating the operation of the controller C when changing the sensitivities of the microphones M1 to M10 according to the position of the passengers. The controller C first reads the signals from the seat sensors 211 (step A1) and determines whether all the seats are vacant (step A2). When it is determined one or more seats are not vacant, the controller C lowers the sensitivity of the microphone(s) for the vacant seat(s). (step A3) When it is determined that all the seats are vacant, the controller C lowers the sensitivity of all the microphones M1 to M10.

Thus the noise at the occupied seats can be efficiently and effectively damped.

FIG. 19 shows the flow chart for illustrating the operation of the controller C when changing the sensitivities of the microphones M1 to M10 according to the engine speed. The controller C first reads the current engine speed r in step B1. Then the controller C determines whether the current engine speed r is in a predetermined range of $r_L$ to $r_H$. (steps B2 and B3) When the current engine speed r is in the predetermined range, the controller C lowers the sensitivities of the microphones M1 to M4, M6 and M7, and increases the sensitivities of the microphones M5 and M8 to M10. (steps B4 and B5) On the other hand, when the current engine speed r is not in the predetermined range, the controller C increases the sensitivities of the microphones M1 to M8 and lowers the sensitivities of the microphones M9 and M10. (steps B6 and B7)

Figure 20:
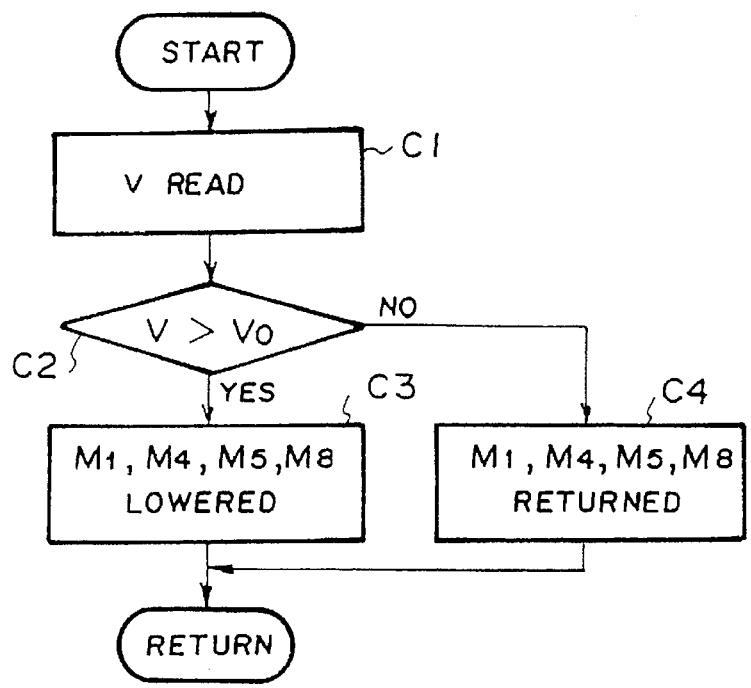
FIG. 20 is a flow chart for illustrating the operation of the controller when changing the sensitivities of the microphones according to the vehicle speed.

FIG. 20 shows the flow chart for illustrating the operation of the controller C when changing the sensitivities of the microphones M1 to M10 according to the vehicle speed. The controller C reads the current vehicle speed v and determines whether the current vehicle speed v is higher than a reference value Vo. (steps C1 and C2) When the former is higher than the latter, the controller C lowers the sensitivities of the outer microphones M1, M4, M5 and M8 and when the former is not higher than the latter, the controller C returns the sensitivities of the outer microphones M1, M4, M5 and M8. (steps C3 and C4)

Thus in this embodiment, the vibration signals from the inner microphones M2, M3, M6 and M7 which are relatively free from wind noise are used for damping the vibration at a higher vehicle speed range, whereby noise inside the cabin can be damped with a high efficiency less affected by wind noise when the vehicle is running at high speed.

Figure 21:
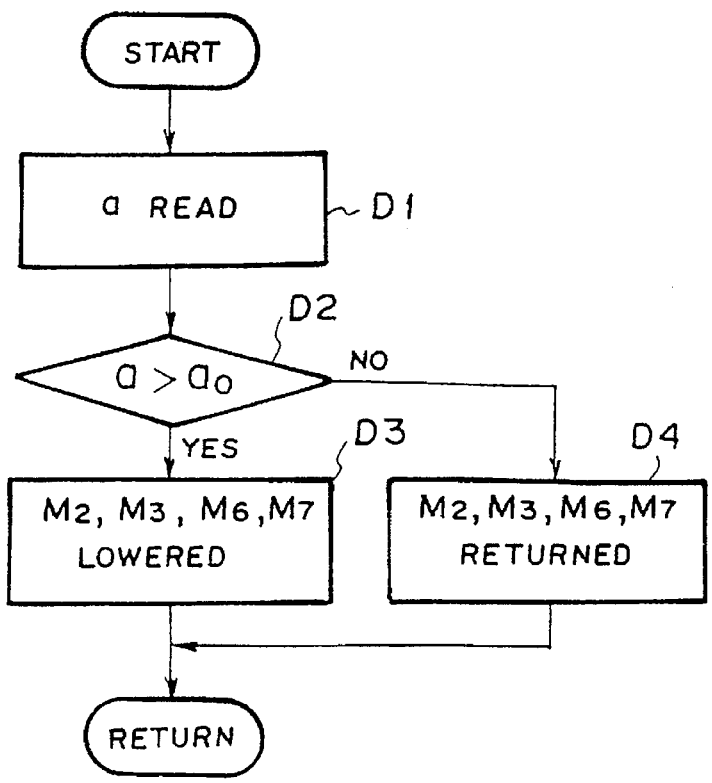
FIG. 21 is a flow chart for illustrating the operation of the controller when changing the sensitivities of the microphones according to the throttle opening.

FIG. 21 shows the flow chart for illustrating the operation of the controller C when changing the sensitivities of the microphones M1 to M10 according to the throttle opening (acceleration). The controller C reads the current throttle opening a and determines whether the current throttle opening a is larger than a reference value $a_o$. (steps D1 and D2) When the former is larger than the latter, the controller C determines that the vehicle is accelerating and lowers the sensitivities of the microphones M2, M3, M6 and M7 and when the former is not larger than the latter, the controller C returns the sensitivities of the microphones M2, M3, M6 and M7. (steps D3 and D4)

Thus in this embodiment, when the vehicle is accelerating, the sensitivity of one of the microphones provided two for each seat is lowered, thereby increasing the speed of response to control so that noise can be effectively damped reacting to change in noise which is apt to occur during acceleration of the vehicle while assuring a high noise damping performance during cruising.

Figure 22:
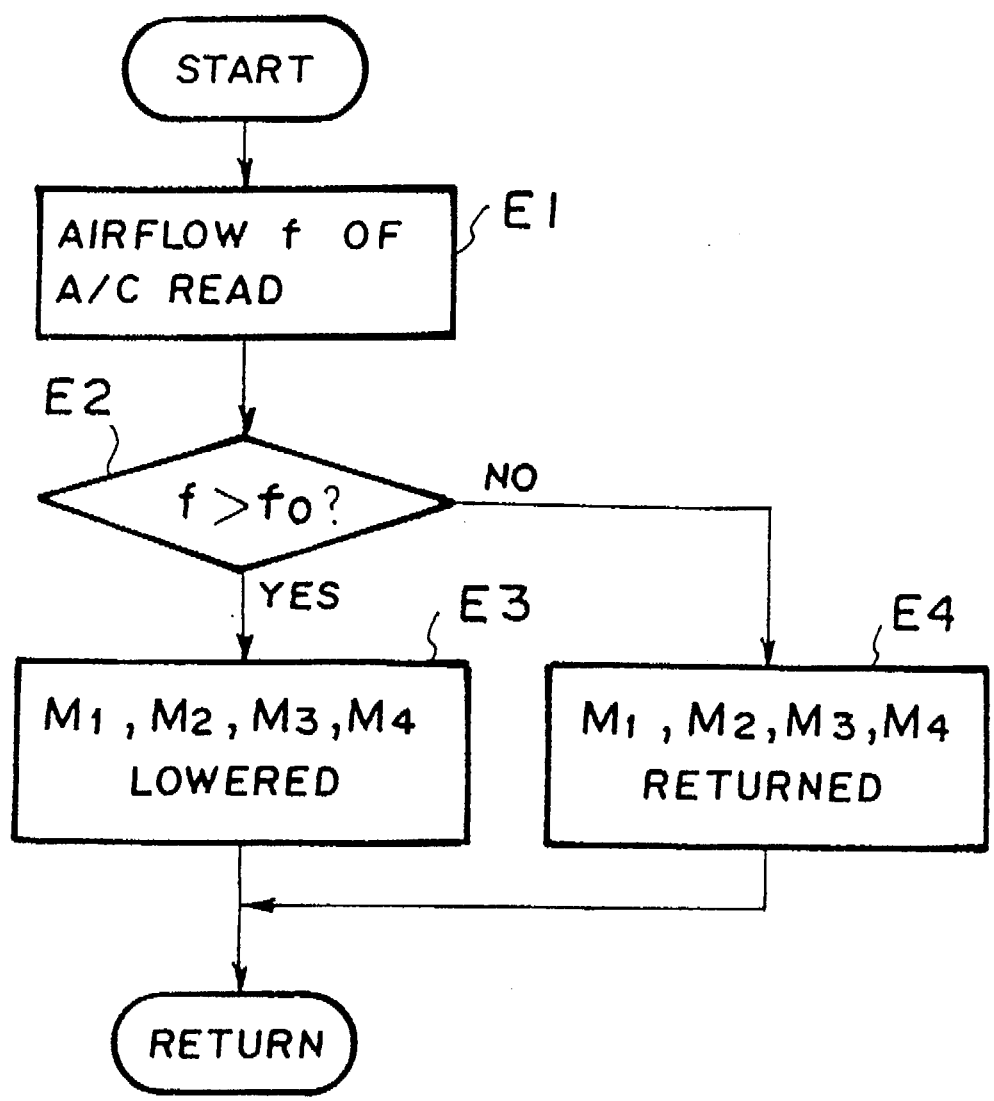
FIG. 22 is a flow chart for illustrating the operation of the controller when changing the sensitivities of the microphones according to the airflow of the air-conditioner.

FIG. 22 shows the flow chart for illustrating the operation of the controller C when changing the sensitivities of the microphones M1 to M10 according to the current airflow f of the air-conditioner A/C. The controller C reads the current airflow f of the air-conditioner A/C and determines whether the current current airflow f is larger than a reference value $f_o$. (steps E1 and E2) When the former is larger than the latter, the controller C lowers the sensitivities of the microphones M1, M2, M3 and M4 and when the former is not larger than the latter, the controller C returns the sensitivities of the microphones M1, M2, M3 and M4. (steps E3 and E4)

Thus in this embodiment, when the airflow f of the air-conditioner A/C is large, the sensitivity the microphones M1 to M4 which are positioned on the front seats and is apt to be affected by the noise generated by the air-conditioner is lowered so that noise can be effectively damped without affected by the noise generated by the air-conditioner.

Figure 23:
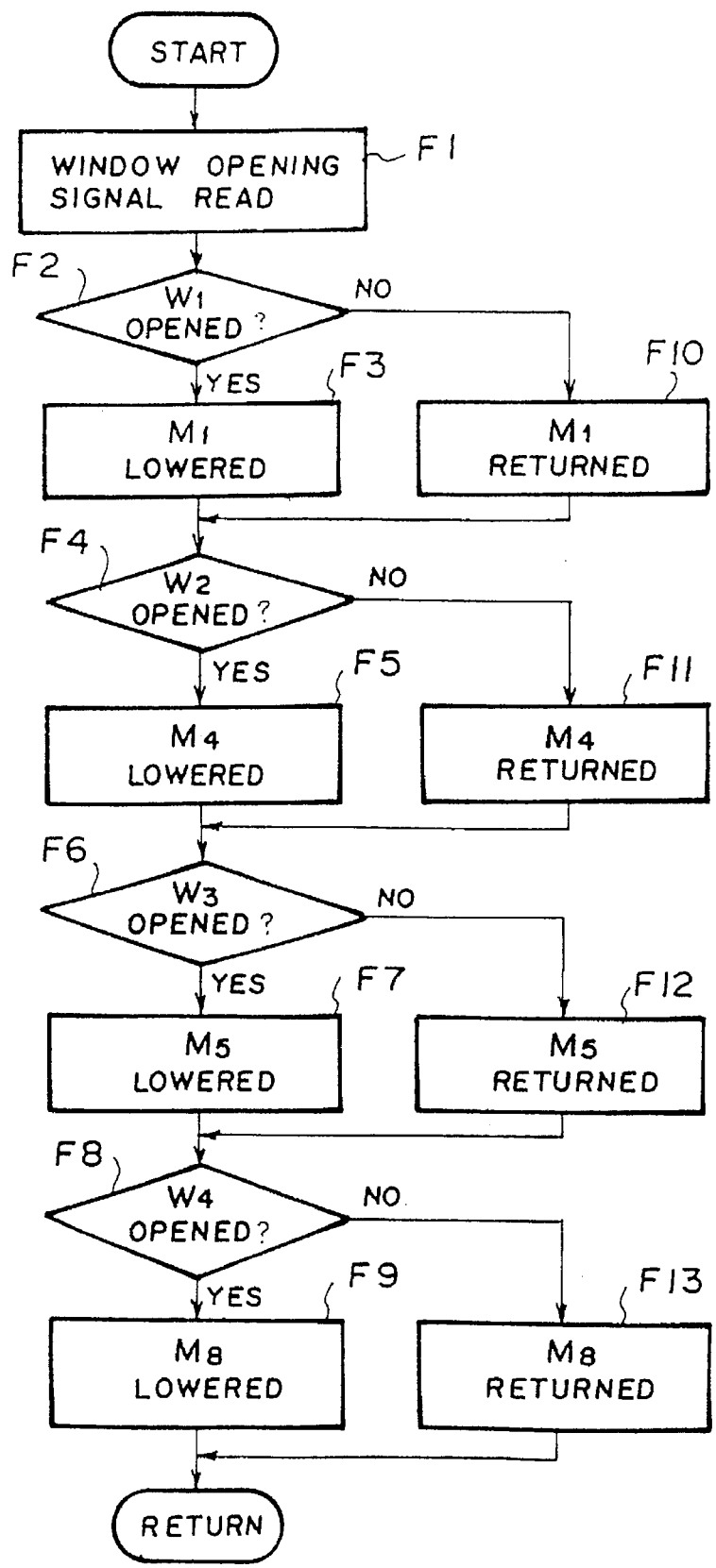
FIG. 23 is a flow chart for illustrating the operation of the controller when changing the sensitivities of the microphones according to whether the windows are opened or closed.

FIG. 23 shows the flow chart for illustrating the operation of the controller C when changing the sensitivities of the microphones M1 to M10 according to whether the windows are opened or closed. The controller C first reads window opening detecting signals from window sensors 214 representing whether the windows W1 to W4 (FIG. 15) are opened or closed. (step F1) Then the controller C determines whether the window W1 is opened. (step F2) When it is determined that the window W1 is opened, the controller C lowers the sensitivity of the microphone M1, and otherwise the controller C returns the sensitivity of the microphone M1. (steps F3 and F10) Then the controller C determines whether the window W2 is opened. (step F4) When it is determined that the window W2 is opened, the controller C lowers the sensitivity of the microphone M4, and otherwise the controller C returns the sensitivity of the microphone M4. (steps F5 and F11) Then the controller C determines whether the window W3 is opened. (step F6) When it is determined that the window W3 is opened, the controller C lowers the sensitivity of the microphone M5, and otherwise the controller C returns the sensitivity of the microphone M5. (steps F5 and F11) Then the controller C determines whether the window W4 is opened. (step F8) When it is determined that the window W4 is opened, the controller C lowers the sensitivity of the microphone M8, and otherwise the controller C returns the sensitivity of the microphone M8. (steps F9 and F13)

In this embodiment, the sensitivity of the microphone is lowered near the open window, whereby noise inside the cabin can be damped with a high efficiency less affected by wind noise.

Figure 24:
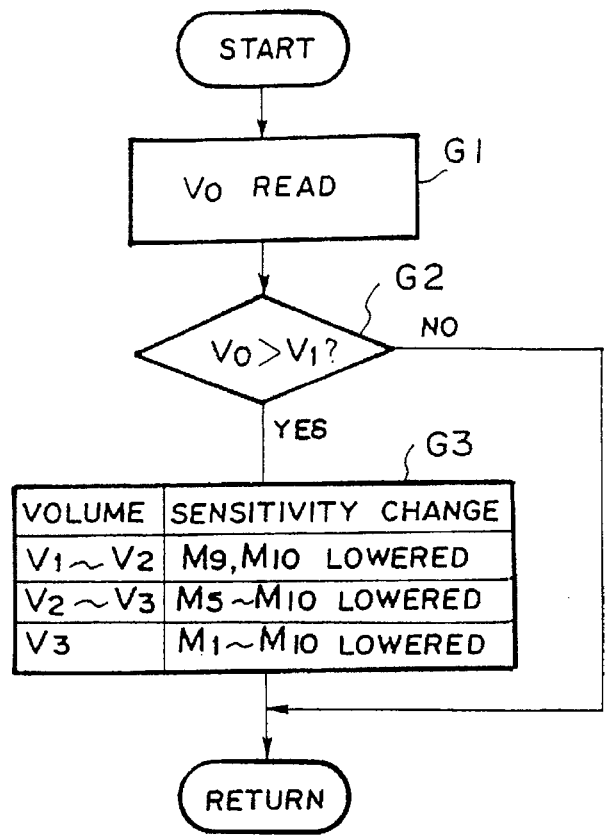
FIG. 24 is a flow chart for illustrating the operation of the controller when changing the sensitivities of the microphones according to the volume of the audio system on the vehicle.

FIG. 24 shows the flow chart for illustrating the operation of the controller C when changing the sensitivities of the microphones M1 to M10 according to the volume of the audio system on the vehicle. The controller C reads the current volume $V_o$ of the audio system and determines whether the current volume $V_o$ is larger than a reference value $V_1$. (steps G1 and G2) When the former is larger than the latter, the controller C changes the sensitivities of the microphones M1 to M10 according to which range the current volume $V_o$ is. That is, when the current volume $V_o$ is in the range of $V_1$ to $V_2$, the controller C lowers the sensitivities of the microphones M9 and M10, when the current volume $V_o$ is in the range of $V_2$ to $V_3$, the controller C lowers the sensitivities of the microphones M5 to M10, and when the current volume $V_o$ is not smaller than $V_3$, the controller C lowers the sensitivities of all the microphones M1 to M10. On the other hand, when the current volume $v_o$ is not larger than the reference value $V_1$, the controller C sets the sensitivities of all the microphone M1 to M10 to the normal values.

In this embodiment, as the volume of the audio system increases, the sensitivities of the microphones which are apt to be affected by the audi system are lowered, whereby noise inside the cabin can be damped with a high efficiency less affected by the sound of the audio system.

Figure 25:
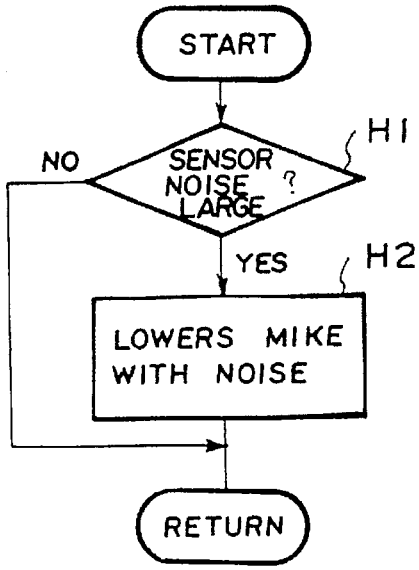
FIG. 25 is a flow chart for illustrating the operation of the controller when changing the sensitivities of the microphones according to the reliabilities of the vibration signals output from the respective microphones.

FIG. 25 shows the flow chart for illustrating the operation of the controller C when changing the sensitivities of the microphones M1 to M10 according to the reliabilities of the vibration signals output from the respective microphones M1 to M10. As shown in FIG. 25, the controller C determines whether noise in the vibration signal output from each of the microphones M1 to M10 is large. (step H1) When there is one or more vibration signal including large noise, the controller C lowers the sensitivity of the microphone(s) outputting the vibration signal including large noise. Thus noise in the cabin can be effectively damped on the basis of the vibration signals having high reliability.

Figure 26:
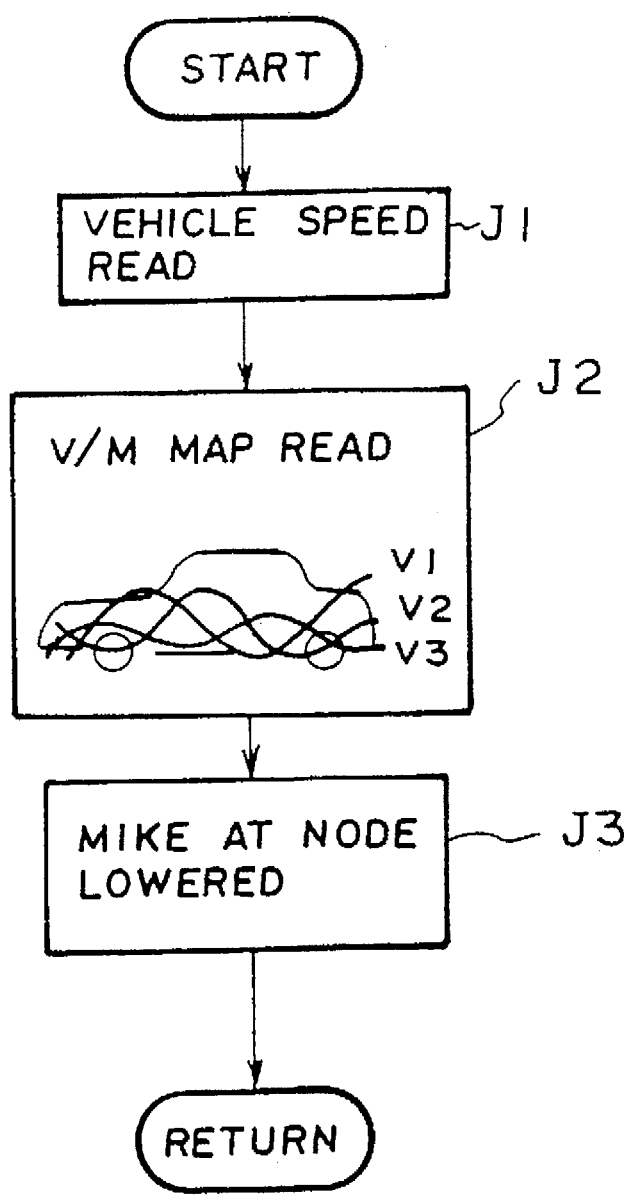
FIG. 26 is a flow chart for illustrating the operation of the controller when changing the sensitivities of the microphones according to the vibration mode on the basis of the vehicle speed.

FIG. 26 shows the flow chart for illustrating the operation of the controller C when changing the sensitivities of the microphones M1 to M10 according to the vibration mode on the basis of the vehicle speed. The controller C reads the vehicle speed and reads the vibration mode from a memory map in which the relation between the vehicle speed and the vibration mode which has been experimentally determined are stored. (steps J1 and J2) Then the controller C lowers the sensitivity of the microphone which is positioned at the node of the vibration (cavity resonance) in the vibration mode determined in step J2. (step J3)

In this embodiment, the sensitivity of the microphone which is positioned at the node of the vibration and cannot provide useful vibration information is lowered, whereby noise in the cabin can be effectively damped on the basis of only the vibration signals bearing thereon useful information.

The sensitivity of the microphone can be changed, for instance, by changing the level of the vibration signal output from the microphone or by changing the frequency at which the vibration signal output from the microphone is input into the control means 210.

Figure 27A:
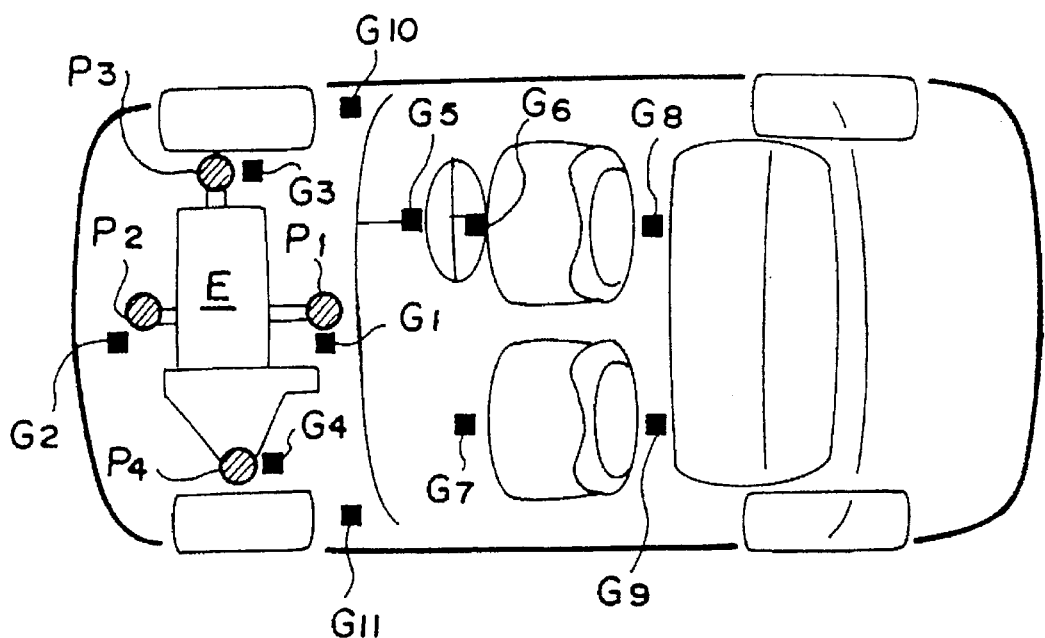
FIG. 27A is a schematic plan view showing a vehicle provided with a vibration damping system in accordance with a fifth embodiment of the present invention.
Figure 27B:
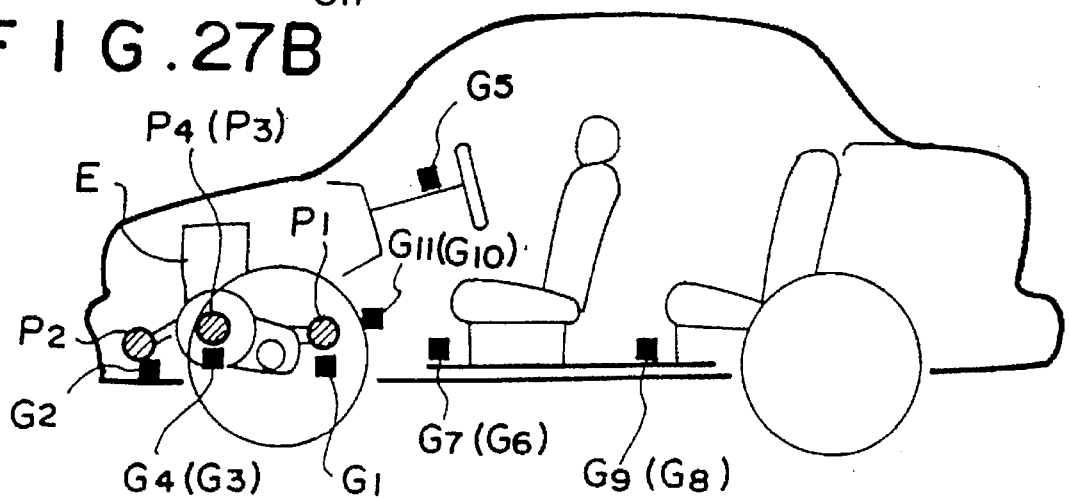
FIG. 27B is a schematic side view of the vehicles.

Fifth embodiment of the present invention will be described with reference to FIGS. 27A to 32, hereinbelow. FIG. 27A is a schematic plan view showing a vehicle provided with a vibration damping system in accordance with a fifth embodiment of the present invention and FIG. 27B is a schematic side view of the vehicle.

The damping system of this embodiment is provided with eleven acceleration sensors G1 to G11 (as vibration sensors) and four engine mounts P1 to P4 (as actuators) positioned at mounting portions of the engine E to the vehicle body. Each of the acceleration sensors G1 to G11 is disposed in a predetermined position and detects acceleration (solid vibration) in the position. In this embodiment, solid vibration generated in predetermined positions on the vehicle body mainly due to vibration of the engine E is detected and damped by driving the mounts P1 to P4 on the basis of the result of the detection. The overall structure of the vibration damping system of this embodiment corresponds to that obtained by substituting the acceleration sensors G1 to G11 and the mounts P1 to P4 respectively for the microphones M1 to M10 and the speakers S1 to S5 in the fourth embodiments shown in FIGS. 16 and 17. In this embodiment, the sensitivity changing means changes the sensitivities of the acceleration sensors G1 to G11 by selectively inputting one or more of the vibration signals output from the acceleration sensors G1 to G11 into the control means.

Sensitivity changing operation (selection) of the acceleration sensors in this embodiment will be described, hereinbelow.

Figure 28:
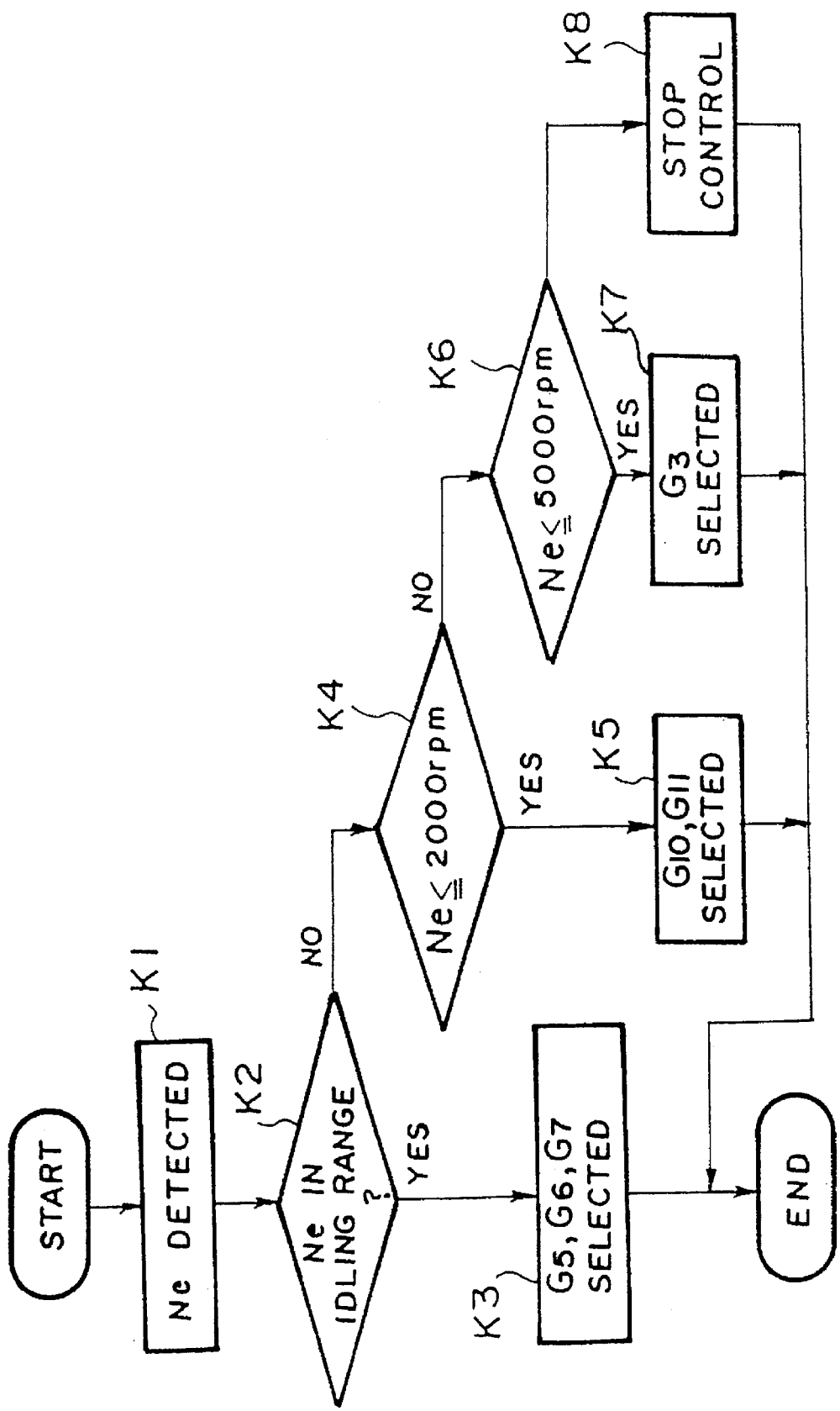
FIG. 28 is a flow chart for illustrating the operation of the controller when changing the sensitivities of the acceleration sensors according to the engine speed.

FIG. 28 shows the flow chart for illustrating the operation of the controller C when changing the sensitivities of the acceleration sensors G1 to G11 according to the engine speed.

In FIG. 28, the controller C first detects the current engine speed Ne. (step K1) Then the controller C determines in step K2 whether the current engine speed Ne is in the idling range. When it is determined that the current engine speed Ne is in the idling range, the controller C selects the acceleration sensors G5, G6 and G7 and inputs only the vibration signals from these acceleration sensors into the control means 210. When it is determined in step K2 that the current engine speed Ne is not in the idling range, the controller C determines in step K4 whether the current engine speed Ne is not higher than 2000 rpm. When it is determined that the current engine speed Ne is not higher than 2000 rpm, the controller C selects the acceleration sensors G10 and G11 and inputs only the vibration signals from these acceleration sensors into the control means 210. When it is determined in step K4 that the current engine speed Ne is higher than 2000 rpm, the controller C determines in step K6 whether the current engine speed Ne is not higher than 5000 rpm. When it is determined that the current engine speed Ne is not higher than 5000 rpm, the controller C selects the acceleration sensor G3 and inputs only the vibration signal from this acceleration sensor into the control means 210. When it is determined in step K6 that the current engine speed Ne is higher than 5000 rpm, the controller C interrupts the vibration damping control. (step K8)

When the engine is idling, bending vibration and/or torsional vibration of the vehicle body are apt to be generated especially at the front portion of the floor and at the steering column. Accordingly when the acceleration sensors G5, G6 and G7 disposed there are selected, vibration can be effectively damped. At a higher engine speed range, resounding noise is generated in the cabin. Accordingly when the acceleration sensors G10, G11 and G3 disposed on the door panel inheres and on the mount portion on the right side of the engine E which greatly distribute to generation of the resounding noise are selected, the resounding noise can be effectively damped.

Figure 29:
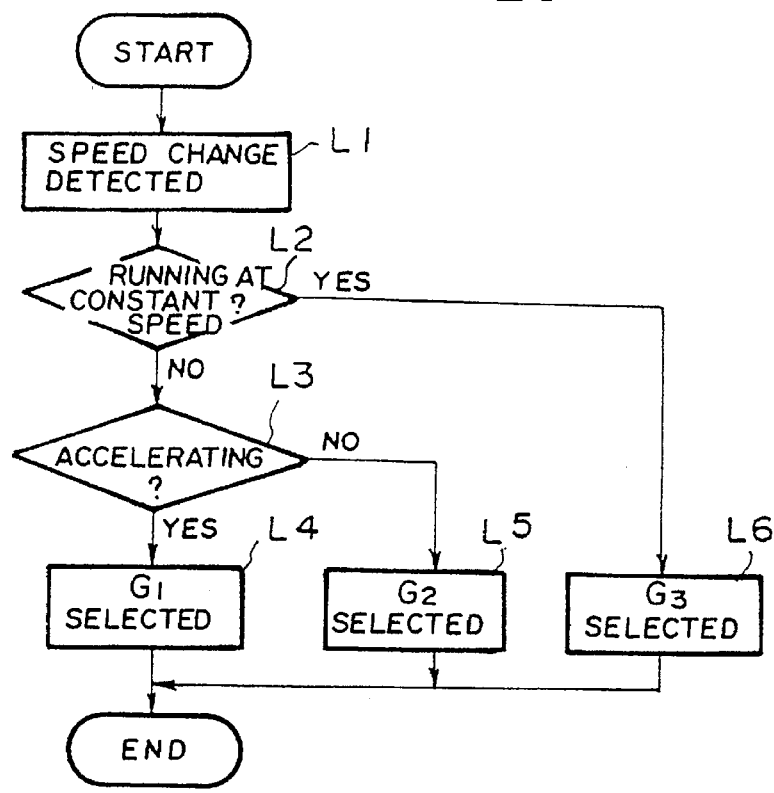
FIG. 29 is a flow chart for illustrating the operation of the controller when changing the sensitivities of the acceleration sensors according to whether the vehicle is accelerating or decelerating.

FIG. 29 shows the flow chart for illustrating the operation of the controller C when changing the sensitivities of the acceleration sensors G1 to G11 according to whether the vehicle is accelerating or decelerating.

In FIG. 29, the controller C first detects change in the vehicle speed. (step L1) Then the controller C determines in step L2 whether the vehicle is running at a constant speed (cruising). When it is determined that the vehicle is not running at a constant speed, the controller C determines in step L3 whether the vehicle is accelerating. When it is determined that the vehicle is accelerating, the controller C selects the acceleration sensor G1 and inputs only the vibration signal from this acceleration sensor into the control means 210. (step L4) When it is determined in step L3 that the vehicle is not accelerating, that is, when the vehicle is decelerating, the controller C selects the acceleration sensor G2 and inputs only the vibration signal from this acceleration sensor into the control means 210. When it is determined in step L2 that the vehicle is running at a constant speed, the controller C selects the acceleration sensor G6 and inputs only the vibration signal from this acceleration sensor into the control means 210. (step L6)

When the vehicle is accelerating, the engine E inclines rearward and vibration input from the mount P1 becomes larger. Accordingly by selecting the acceleration sensor G1 disposed near the mount p1, vibration can be efficiently damped. On the other hand, when the vehicle is decelerating, the engine E inclines forward and vibration input from the mount P2 becomes larger. Accordingly by selecting the acceleration sensor G2 disposed near the mount p2, vibration can be efficiently damped.

Figure 30:
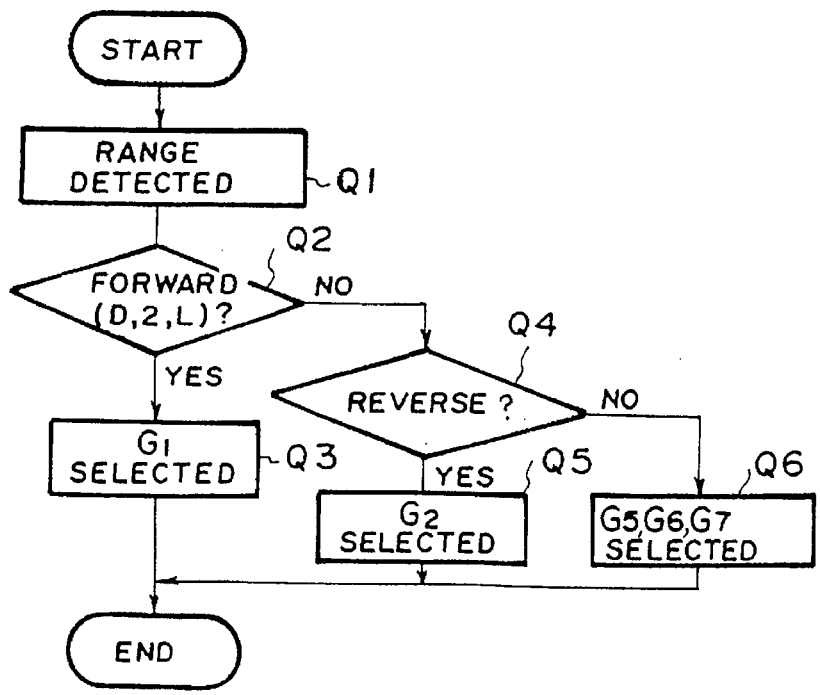
FIG. 30 is a flow chart for illustrating the operation of the controller C when changing the sensitivities of the acceleration sensors according to the range of an automatic transmission.

FIG. 30 shows the flow chart for illustrating the operation of the controller C when changing the sensitivities of the acceleration sensors G1 to G11 according to the range of an automatic transmission. The controller C first detects the range of the automatic transmission and determines whether the transmission is in forward (D-range, 1-range or 2-range). (steps Q1 and Q2) When it is determined that the transmission is in forward, the controller C considers that the vehicle is accelerating and selects the acceleration sensor G1. (step Q3) When it is determined in step Q2 that the transmission is not in forward, the controller C determines in step Q4 whether the transmission is in reverse. When it is determined that the transmission is in reverse, the controller C considers that the vehicle is decelerating and selects the acceleration sensor G2. When it is determined that the transmission is not in reverse, that is, when the transmission is in neutral and the engine is idling, the controller C selects the acceleration sensors G5, G6 and G7.

Figure 31:
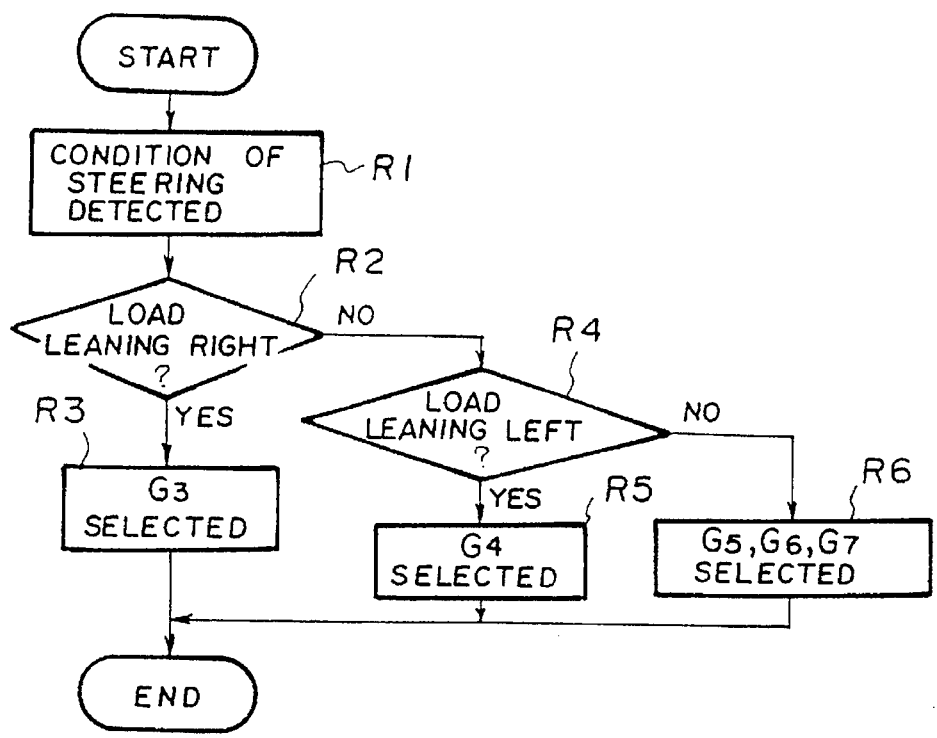
FIG. 31 is a flow chart for illustrating the operation of the controller when changing the sensitivities of the acceleration sensors according to whether the vehicle is making a lane change or cornering.

FIG. 31 shows the flow chart for illustrating the operation of the controller C when changing the sensitivities of the acceleration sensors G1 to G11 according to the condition of steering, that is, whether the vehicle is making a lane change or cornering. The controller C detects the condition of steering, that is, whether the vehicle is making a lane change or cornering. (step R1) Then in step R2, the controller C determines whether the load on the vehicle is leaning rightward. When it is determined that the load on the vehicle is leaning rightward, the controller C selects the acceleration sensor G3. (step R3) When it is determined in step R2 that the load on the vehicle is not leaning rightward, the controller C determines in step R4 whether the load on the vehicle is leaning leftward. When it is determined that the load on the vehicle is leaning leftward, the controller C selects the acceleration sensor G4. (step R5) When it is determined in step R4 that the load on the vehicle is leaning not leftward, the controller C selects the acceleration sensors G5, G6 and G7. (step R6)

When the load on the vehicle leans rightward, the engine E inclines rightward and vibration input from the mount P3 becomes larger. Accordingly by selecting the acceleration sensor G3 disposed near the mount p3, vibration can be efficiently damped. On the other hand, when the load on the vehicle leans leftward, the engine E inclines leftward and vibration input from the mount P4 becomes larger. Accordingly by selecting the acceleration sensor G4 disposed near the mount p4, vibration can be efficiently damped.

Figure 32:
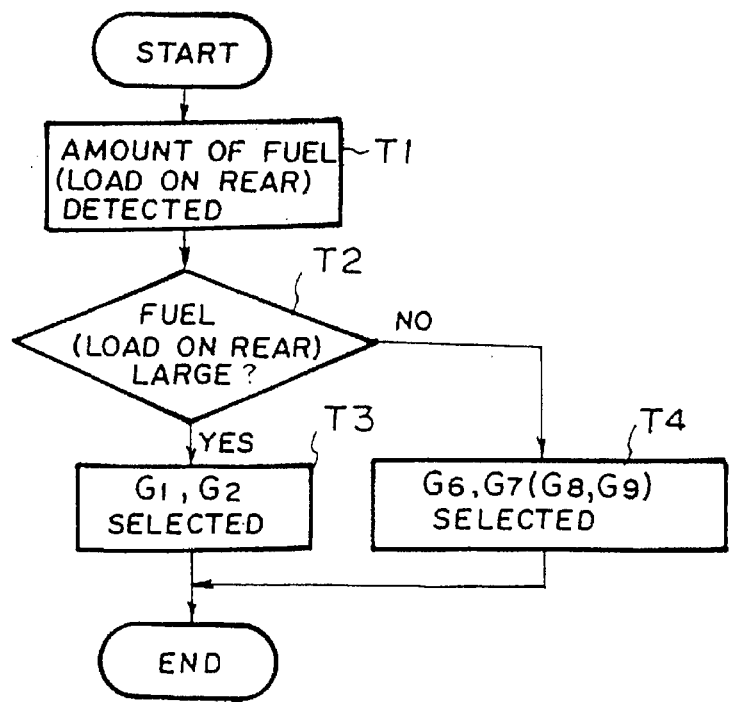
FIG. 32 is a flow chart for illustrating the operation of the controller when changing the sensitivities of the acceleration sensors according to the amount fuel in a fuel reservoir provided on the rear of the vehicle body.

FIG. 32 shows the flow chart for illustrating the operation of the controller C when changing the sensitivities of the acceleration sensors G1 to G11 according to the amount fuel in a fuel reservoir provided on the rear of the vehicle body. The controller C detects the amount fuel in the fuel reservoir. (step T1) Then the controller C determines in step T2 whether the amount of fuel is large. When it is determined that the amount of fuel is large, the controller C selects the acceleration sensors G1 and G2. (step T3) Otherwise the controller C selects the acceleration sensor G6 and G7 or G8 and G9. (step T4)

When the amount of fuel in the fuel reservoir is large, the load on the rear of the vehicle body is heavy. In this case, the front of vehicle body becomes light relative to the rear of the vehicle body and vibration in the front of the vehicle body increases. Accordingly by selecting the acceleration sensors G1 and G2 disposed in the front of the vehicle body, vibration can be efficiently damped.

In the above descriptions, the sensitivities of the acceleration sensors G1 to G11 are changed by selecting one or more of them, which means that the sensitivities of the other acceleration sensors are nullified. However the sensitivities of the acceleration sensors G1 to G11 may be changed by reducing the frequency at which the vibration signals of the other acceleration sensors (those not selected) are input into the control means 210.

A sixth embodiment of the present invention will be described, hereinbelow. In this embodiment, the sensitivities of the vibration sensors are changed by changing the level of the vibration signals to be input into the control means.

Figure 33:
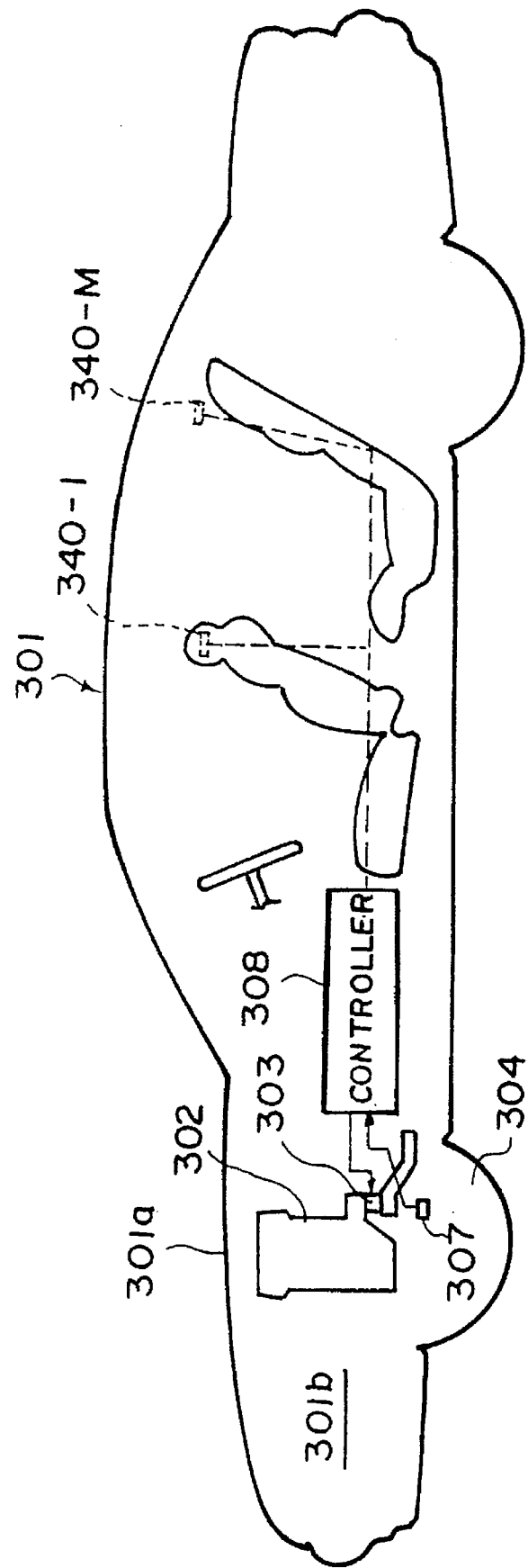
FIG. 33 is a schematic view showing a vehicle provided with a vibration damping system in accordance with a sixth embodiment of the present invention.

In FIG. 33, an engine 302 is housed in an engine room 301b of a vehicle body 301. Reference numeral 301a denotes an engine hood. The engine 302 is resiliently supported by the vehicle body 301 by way of mounts 303 and support brackets 304.

The mounts 303 are the same as the engine mounts 134 shown in FIG. 1 and described above in conjunction with the second embodiment of the present invention and accordingly will not be described here.

In FIG. 33, an acceleration sensor (vibration sensor) 307 is disposed on the vehicle body 1 near the engine 302 and detects the vibration of the engine 302 through the vertical acceleration of the vehicle body 301. The detecting signal of the acceleration sensor 307 is input into a controller 308. The controller 308 controls the mount 303 to vibrate the engine 302 in the vertical direction according to the vertical acceleration signal from the acceleration sensor 307, thereby damping the vibration of the engine 302 and accordingly the vibration of the vehicle body 301.

As shown in FIG. 34, the controller 308 comprises an engine revolution cycle detecting circuit 310 which detects the cycle of engine revolution through the ignition signal of the engine 302, a reference signal generator 311 which generates a reference signal R related to the vibration of the engine 302 on the basis of the engine revolution cycle detected by the engine revolution cycle detecting circuit 310, an amplifier 312 (as an input side level adjusting means) which amplifies the acceleration signal from the acceleration sensor 307 with a preset gain G2, a low-pass filter 313 which filters the low frequency component of the acceleration signal amplified by the amplifier 312, an A/D convertor 314 which converts the acceleration signal filtered by the low-pass filter 313 into a digital signal, a driving signal generator 315 which receives the digital acceleration signal S from the A/D convertor 314 and generates a driving signal A for vibrating the engine mount 303 on the basis of the acceleration signal S, a D/A convertor 317 which converts the driving signal A into an analog signal, a low-pass filter 318 which filters the low frequency component of the driving signal from the D/A convertor 317, and an amplifier 319 (as an output side level adjusting means) which amplifies the driving signal filtered by the low-pass filter 318 with a preset gain G1 and outputs the driving signal to the engine mount 303.

In the driving signal generator 315, an adaptive algorithm of Least Mean Square Method is used as an algorithm for generating the driving signal. The structure of the driving signal generator 315 will be described with reference to FIG. 315, hereinbelow. Reference numeral 320 denotes a digital filter which is modeled on the transmission characteristic H from the time the mount 303 is applied with the driving signal A to be vibrated to the time the acceleration sensor 307 outputs to the driving signal generator 315 an acceleration signal S bearing thereon the change in vibration of the vehicle body caused by the vibration of the mount 303, reference numeral 321 denotes a convergent factor calculating circuit which calculates a convergent factor α for rewriting a filter factor according to the acceleration signal S from the acceleration sensor 307, reference numeral 322 denotes a multiplier which multiplies the reference signal R by the transmission characteristic H and the convergent factor α and reference numeral 323 denotes an adaptive filter whose filter factor is updated on the basis of the output of the multiplier 322 each time the multiplier 322 outputs and which outputs, on the basis of the updated filter factor, a driving signal A which is reverse to the reference signal R in phase and equal to the same in amplitude.

In FIG. 34, reference numeral 325 denotes a signal level measuring circuit which converts the acceleration signal of the acceleration sensor 307 into an absolute value or an effective value while the acceleration sensor 307 doubling as the vibration sensor detecting the vibration of the engine and measures the level E of the acceleration signal representing the condition of vibration of the engine. Reference numeral 326 denotes a gain adjusting mechanism which changes the gains G1 and G2 of the input side and output side amplifiers 312 and 319 on the basis of the signal level E detected by the signal level measuring circuit 325.

Figure 36:
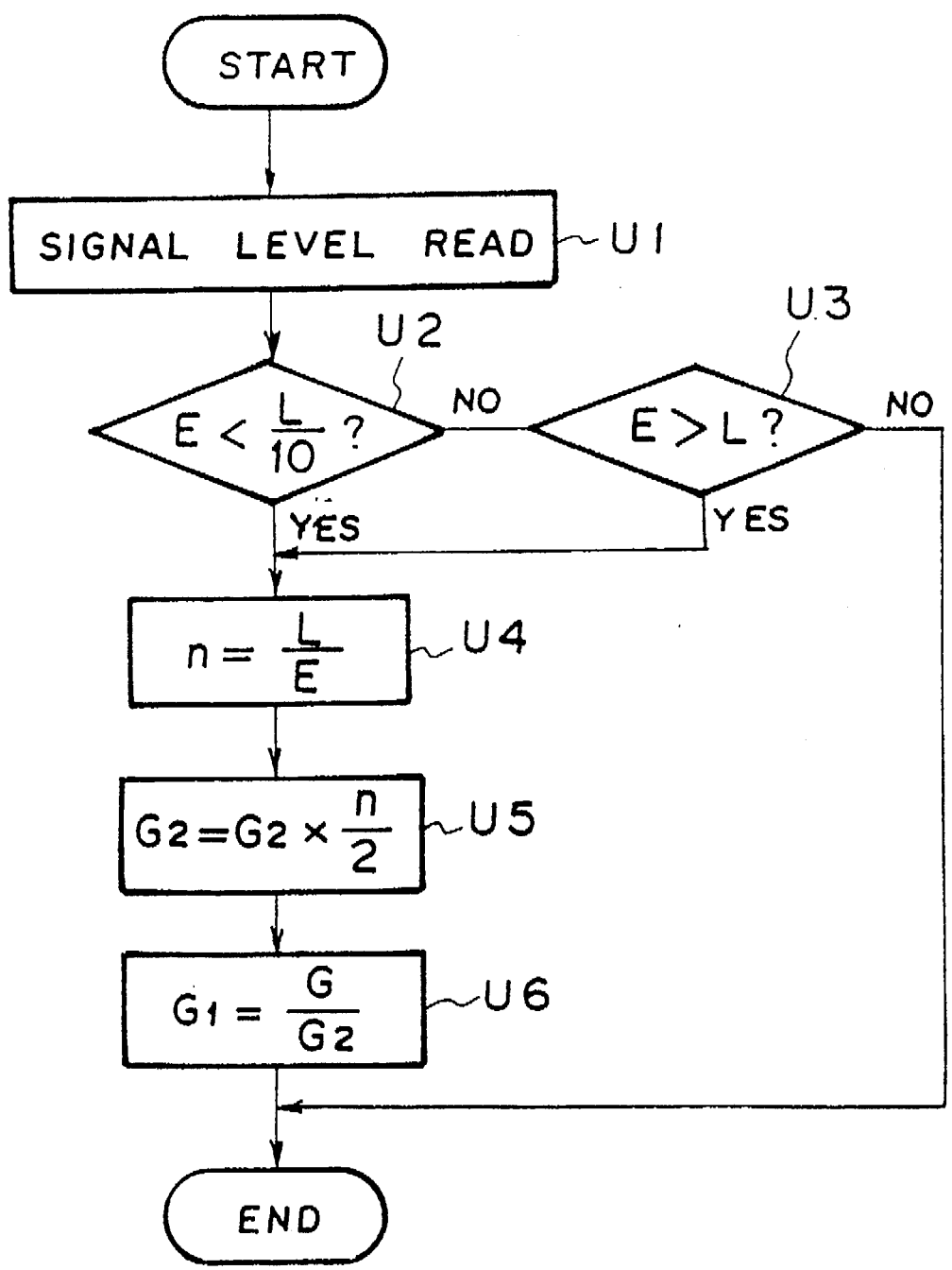
FIG. 36 is a flow chart showing the manner in which the gain adjusting mechanism changes the gains.

FIG. 36 is a flow chart showing the manner in which the gain adjusting mechanism 326 changes the gains G1 and G2. In step U1, the signal level E in the form of an absolute value or an effective value is read. Then the signal level E is compared with an input acceptability limit L of the input side A/D convertor 314 and one tenth of the same (L/10). (steps U2 and U3) The gains are adjusted only when the signal level E is not within the range of L/10 to L taking into account the follow-up speed of the convergence of the adaptive algorithm of the LMS. In step U4, the ratio n of the input acceptability limit L to the signal level E (L/E) is calculated, and in step U5, the gain G2 of the input side amplifier 312 is adjusted to half of the ratio n (n/2). Then the gain G1 of the output side amplifier 319 to G/G2, G representing the gain of the whole input/output, so that the transmission characteristic model or the gain of the whole input/output does not change. (step U6)

Thus the gains G1 and G2 of the input side and output side amplifiers 312 and 319 are changed according to the signal level E detected by the signal level measuring circuit 325, and the level of the acceleration signal s input from the acceleration sensor 307 into the driving signal generator 315 and the level of the driving signal A input from the driving signal generator 315 into the engine mount 303 are changed with a predetermined relation therebetween. When the signal level E of the acceleration signal S exceeds the input acceptability limit L, the level E of the acceleration signal S is lowered by setting the gain G2 of the input side amplifier 312 to L/2E times and at the same time the level of the driving signal A is increased by setting the gain G1 of the output side amplifier 319 to 2E/L times. On the other hand, when the signal level E of the acceleration signal S is smaller than one tenth of the input acceptability limit L (L/10), the level E of the acceleration signal S is increased by setting the gain G2 of the input side amplifier 312 to L/2E times and at the same time the level of the driving signal A is lowered by setting the gain G1 of the output side amplifier 319 to 2E/L times.

In this embodiment, a driving signal A which represents vibration which is the same as the reference signal R in amplitude and reverse to the same in phase is generated by the adaptive algorithm of LMS on the basis of the acceleration signal S from the acceleration sensor 307, and the engine mount 303 is vibrated under the control of the driving signal A and the vibration of the engine mount 303 is transmitted to the engine 302. Accordingly the vibration of the engine 302 is canceled by the vibration of the vehicle body is damped and the calmness of the vehicle is improved.

Since when the signal level E of the acceleration signal S from the acceleration sensor 307 is too high, the gain G2 of the input side amplifier is lowered and the signal level E of the acceleration signal input into the A/D convertor 314 is lowered, the waveform of the acceleration signal S can be taken in the dynamic range of the driving signal generator 315 with a high accuracy even if the dynamic range of the driving signal generator 315 is not so wide. As a result, the driving signal generator 315 can generate the driving signal A with a high accuracy and the vibration of the engine can be effectively damped. Further since the level of the driving signal A is increased, the amplitude of the vibration transmitted to the engine 302 from the engine mount 303 is well conform to the amplitude of the vibration of the engine 302, an excellent vibration damping effect can be ensured.

Further since when the signal level E of the acceleration signal S from the acceleration sensor 307 is too low, the gain G2 of the input side amplifier is increased and the signal level E of the acceleration signal input into the A/D convertor 314 is increased, the amplitude of the acceleration signal S largely expands in the dynamic range of the driving signal generator 315 and even if the change in the acceleration signal S as output from the acceleration sensor 307 is fine, the driving signal generator 315 can generate a driving signal A which precisely conforms to the fine change. As a result, the vibration of the engine can be effectively damped. Further since the level of the driving signal A is lowered, the amplitude of the vibration transmitted to the engine 302 from the engine mount 303 is well conform to the amplitude of the vibration of the engine 302, an excellent vibration damping effect can be ensured.

Though, in the embodiment described above, the gains are adjusted only when the signal level E is not within the range of L/10 to L, they may be adjusted over the entire signal level range.

Figure 37:
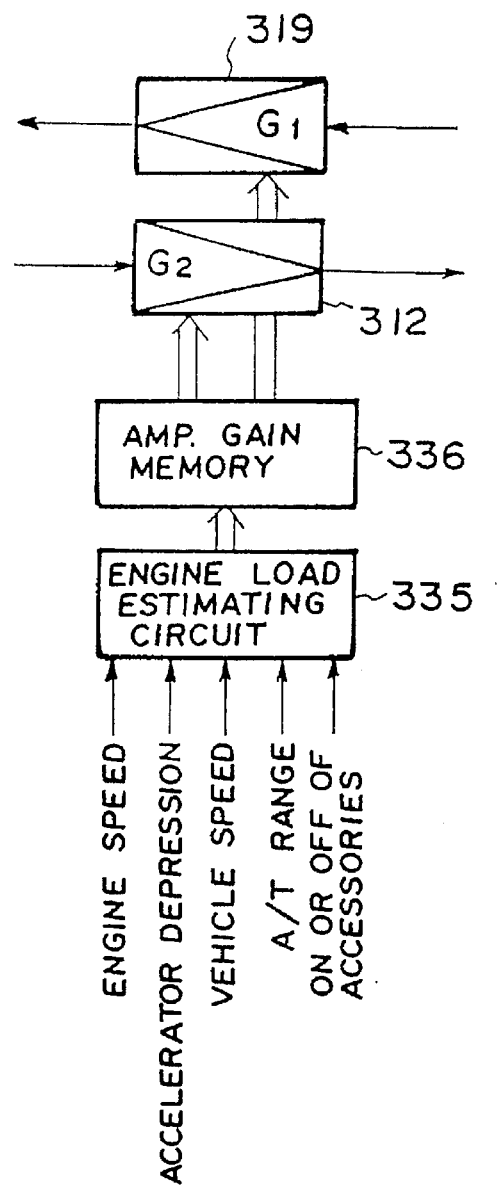
FIG. 37 is a block diagram showing a part of a modification of the sixth embodiment.

FIG. 37 shows a modification of the sixth embodiment. Though, in the sixth embodiment, the condition of the engine vibration is indirectly detected through the acceleration signal level from the acceleration sensor 307 and the gains G1 and G2 of the amplifiers 312 and 319 are adjusted on the basis of the acceleration signal level, the gains G1 and G2 are adjusted on the basis of an estimated engine load.

Figure 38:
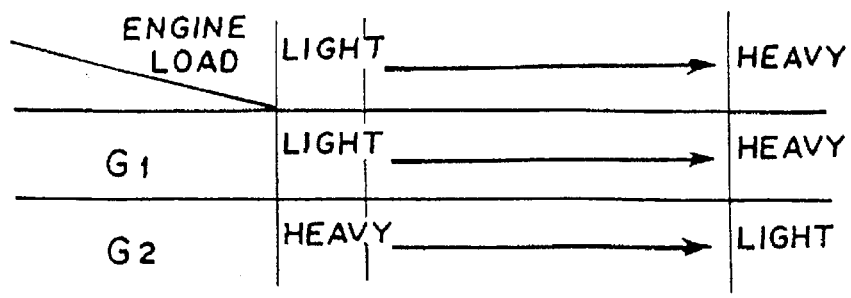
FIG. 38 is a view showing a memory map for changing the gains on the basis of the estimated engine load.

As shown in FIG. 37, an engine load estimating circuit 335 is provided. The engine load estimating circuit 335 receives signals representing the engine speed, the amount of depression of the accelerator pedal, the vehicle speed, the range of the automatic transmission, and on or off of the accessories such as an air-conditioner and estimates the engine load on the basis of these signals. Further an amplifier gain memory 336 is provided. The amplifier gain memory 336 stores a map in which the gain G2 of the input side amplifier 312 decreases and the gain g1 of the output side amplifier 319 increases as the estimated engine load or the vibration of the engine 302 increases as shown in FIG. 38. When the engine load estimating circuit output an engine load signal, the amplifier gain memory 336 reads out the gains G1 and G2 corresponding to the estimated engine load and controls the amplifiers 312 and 319 to have the gains. In the map stored in the amplifier gain memory 336, the gains G1 and G2 for a given estimated engine load are set to satisfy the relation G1×G2=G (constant).

Also in this modification, an effect similar to that in the sixth embodiment can be obtained.

The engine load may be estimated solely on the basis of the amount of depression of the accelerator pedal as shown in FIG. 39, or solely on the basis of the range of the automatic transmission as shown in FIG. 40.

What is claimed is:

1. A vibration damping system for a vehicle comprising a plurality of vibration sensors for detecting vibration of particular vibrating elements, an actuator for applying vibration to the particular vibrating elements, a control means for receiving vibration signals output from the vibration sensors and controlling the actuator to apply to the particular vibrating elements such vibration that dampens the vibration detected by the vibration sensors, and means for changing a ratio among the inputs of the vibration signals output from the vibration sensors according to a predetermined condition of the vehicle wherein said predetermined condition of the vehicle is a driving condition of the vehicle.

2. A vibration damping system as defined in claim 1 in which said predetermined condition of the vehicle is the engine speed.

3. A vibration damping system as defined in claim 1 in which said predetermined condition of the vehicle is the load on the engine.

4. A vibration damping system as defined in claim 1 in which said predetermined condition of the vehicle is whether the vehicle is accelerating or decelerating.

5. A vibration damping system as defined in claim 1 in which said predetermined condition of the vehicle is the vehicle speed.

6. A vibration damping system as defined in claim 1 in which said predetermined condition of the vehicle is the condition of a transmission on the vehicle.

7. A vibration damping system for a vehicle comprising a plurality of vibration sensors for detecting vibration of particular vibrating elements, an actuator for applying vibration to the particular vibrating elements, a control means for receiving vibration signals output from the vibration sensors and controlling the actuator to apply to the particular vibrating elements such vibration that dampens the vibration detected by the vibration sensors, and a sensitivity changing means for changing a ratio among the inputs of the vibration signals output from the vibration sensors according to a predetermined condition of the vehicle;

wherein said predetermined condition of the vehicle is the vibration mode of the vehicle body and said sensitivity changing means lowers the sensitivity of a vibration sensor which is positioned substantially at a node of the vibration in the vibration mode.

8. A vibration damping system as defined in claim 7 in which said predetermined condition of the vehicle is the vibration mode of the vehicle body and said sensitivity changing means lowers the sensitivity of the vibration sensor which is positioned substantially at a node of the vibration in the vibration mode and increases the sensitivity of the vibration sensor which is positioned substantially at an antinode of the vibration.

9. A vibration damping system for a vehicle comprising a plurality of vibration sensors for detecting vibration of particular vibrating elements, an actuator for applying vibration to the particular vibrating elements, a control means for receiving vibration signals output from the vibration sensors and controlling the actuator to apply to the particular vibrating elements such vibration that dampens the vibration detected by the vibration sensors, and means for changing a ratio among the inputs of the vibration signals output from the vibration sensors according to a predetermined condition of the vehicle;

wherein said predetermined condition of the vehicle is the position of the passengers on the vehicle.

10. A vibration damping system for a vehicle comprising a plurality of vibration sensors for detecting vibration of particular vibrating elements, an actuator for applying vibration to the particular vibrating elements, a control means for receiving vibration signals output from the vibration sensors and controlling the actuator to apply to the particular vibrating elements such vibration that dampens the vibration detected by the vibration sensors, and a sensitivity changing means for changing a ratio among the inputs of the vibration signals output from the vibration sensors according to a predetermined condition of the vehicle;

wherein said predetermined condition of the vehicle is the condition of the vibration signal output from the vibration sensor and the sensitivity changing means lowers the sensitivity of the vibration sensor when the condition of the vibration signal output from the vibration sensor is less reliable than the vibration output signal of the remaining vibration sensors.

11. A vibration damping system for a vehicle comprising a plurality of vibration sensors for detecting vibration of particular vibrating elements, an actuator for applying vibration to the particular vibrating elements, a control means for receiving vibration signals output from the vibration sensors and controlling the actuator to apply to the particular vibrating elements such vibration that dampens the vibration detected by the vibration sensors, and a sensitivity changing means for changing a ratio among the inputs of the vibration signals output from the vibration sensors according to a predetermined condition of the vehicle;

wherein the sensitivity changing means increases the level of the vibration signal when the vibration detected by the vibration sensors is lower than a predetermined value, and lowers the level of the vibration signal when the vibration detected by the vibration sensors is greater than a predetermined value; and the sensitivity changing means lowers the level of the driving signal output to the actuator when the level of the vibration signal is increased, and increases said driving signal when the level of the vibration signal is lowered.

12. A vibration damping system for a vehicle comprising a plurality of vibration sensors for detecting vibration of particular vibrating elements, an actuator for applying vibration to the particular vibrating elements, a control means for receiving vibration signals output from the vibration sensors and controlling the actuator to apply to the particular vibrating element such vibration that dampens the vibration detected by the vibration sensors, and a sensitivity changing means for setting the sensitivity of at least one of the vibration sensors that detect the vibration desired to be damped, higher than that of the other vibration sensors wherein the sensitivity changing means determines, on a basis of predetermined factors which affect the vibration, at least one of the vibration sensors that detect a vibration which is preferred to be damped over the other vibration, and sets the sensitivity of said at least one of the vibration sensors higher than that of the other vibration sensors.

13. A vibration damping system for a vehicle comprising a plurality of vibration sensors for detecting vibration of particular vibrating elements, said particular vibrating elements including auxiliary equipment, an actuator for applying vibration to the particular vibrating elements, a control means for receiving vibration signals output from the vibration sensors and controlling the actuator to apply to the particular vibrating elements such vibration that dampens the vibration detected by the vibration sensors, and means for changing a ratio among the inputs of the vibration signals output from the vibration sensors according to a predetermined condition of the vehicle;

wherein said predetermined condition of the vehicle is an operating condition of the auxiliary equipment.

14. A vibration damping system as defined in claim 13 in which said predetermined condition of the vehicle is opening and closure of windows of the vehicle.

15. A vibration damping system as defined in claim 13 in which said predetermined condition of the vehicle is the conditioner of an air-conditioner on the vehicle.

16. A vibration damping system as defined in claim 13 in which said predetermined condition of the vehicle is the condition of an audio system on the vehicle.

* * * * *